US006559964B1

(12) United States Patent
Tsukamoto et al.

(10) Patent No.: US 6,559,964 B1
(45) Date of Patent: *May 6, 2003

(54) METHOD FOR TRANSMITTING SETTING INFORMATION BETWEEN AT LEAST TWO OF APPARATUSES

(75) Inventors: Takeshi Tsukamoto, Kawasaki (JP); Seishi Ejiri, Kawasaki (JP); Soichi Yamamuro, Tokyo (JP); Masaya Kondo, Yokohama (JP); Takekazu Kumagai, Yokohama (JP); Kazuomi Oishi, Yokohama (JP); Masaru Saruwatari, Kawasaki (JP); Masaki Toyama, Kawasaki (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/156,022

(22) Filed: Sep. 17, 1998

Related U.S. Application Data

(63) Continuation of application No. 08/717,544, filed on Sep. 20, 1996, now Pat. No. 5,857,073.

(30) Foreign Application Priority Data

Sep. 22, 1995 (JP) ............................................. 7-244490
Sep. 17, 1996 (JP) ............................................. 8-244837

(51) Int. Cl.$^7$ ............................ G06F 13/00; H04N 1/32
(52) U.S. Cl. ....................................... 358/1.15; 358/442
(58) Field of Search ................................ 358/404, 434, 358/440, 444, 442, 435, 436, 406, 1.15, 1.1, 1.16, 468, 405, 448; H04N 1/00, 1/32, 1/21

(56) References Cited

U.S. PATENT DOCUMENTS

| RE32,115 E | * | 4/1986 | Lockwood et al. ......... 235/381 |
| 5,287,199 A | | 2/1994 | Zoccolillo |
| 5,291,511 A | * | 3/1994 | Maher et al. .............. 370/85.1 |
| 5,345,469 A | * | 9/1994 | Fulghum ..................... 375/1 |
| 5,361,138 A | * | 11/1994 | Motegi et al. .............. 358/404 |
| 5,473,691 A | * | 12/1995 | Menezes et al. ............ 358/440 |
| 5,548,506 A | * | 8/1996 | Srinivasan .............. 364/401 R |
| 5,644,594 A | * | 7/1997 | Johnson et al. ............. 375/222 |
| 5,768,531 A | * | 6/1998 | Lin ....................... 395/200.72 |
| 5,799,159 A | * | 8/1998 | Abe .......................... 395/287 |
| 5,832,240 A | * | 11/1998 | Larsen et al. .............. 395/280 |
| 6,002,490 A | * | 12/1999 | Suzuki ....................... 358/434 |
| 6,067,172 A | * | 5/2000 | Yokoyama .................. 358/442 |

* cited by examiner

Primary Examiner—Madeleine Nguyen
(74) Attorney, Agent, or Firm—Morgan & Finnegan, LLP

(57) ABSTRACT

A data communication apparatus having a connection unit for connecting an information processing terminal, a memory for storing predetermined registration data, a detector for detecting a change in the registration data stored in the memory, and a transfer unit for, if the detector detects a change in the registration data, transferring the changed registration data to change registration data in the information processing terminal connected by the connection unit.

20 Claims, 26 Drawing Sheets

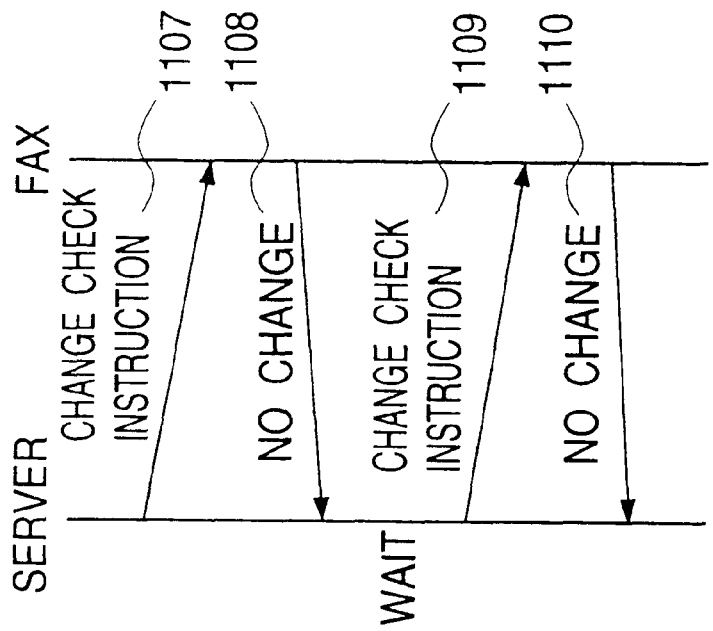
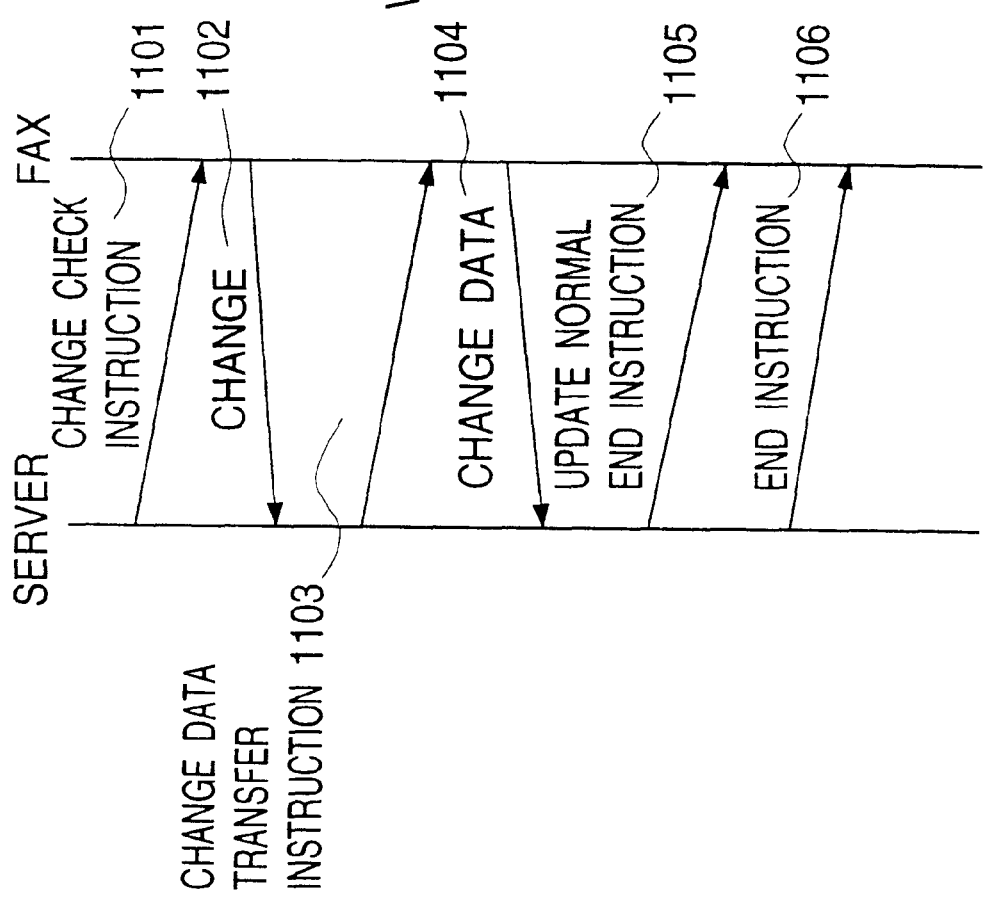

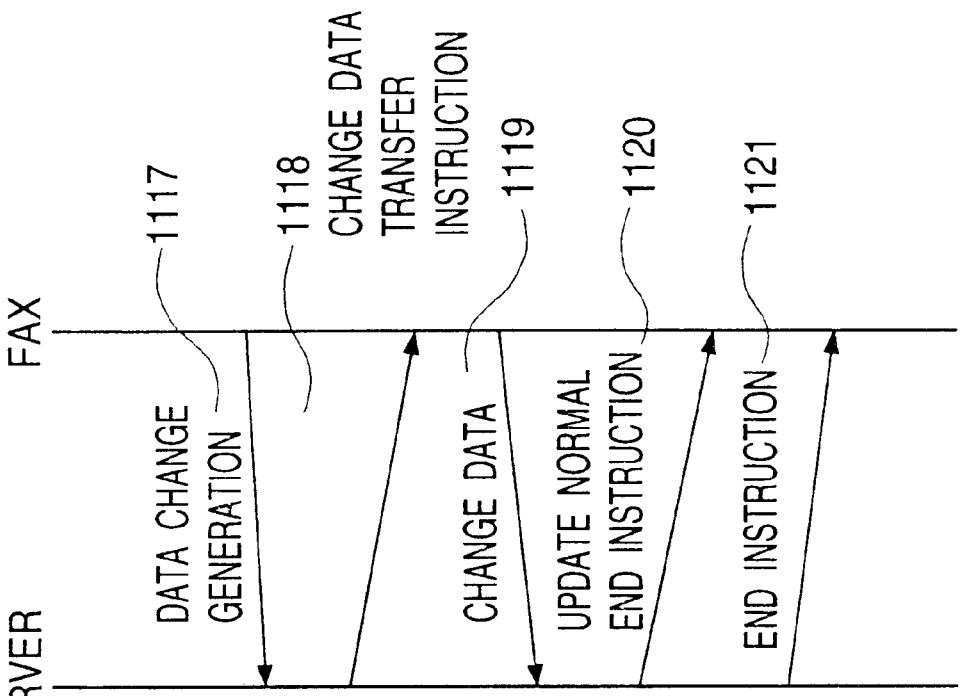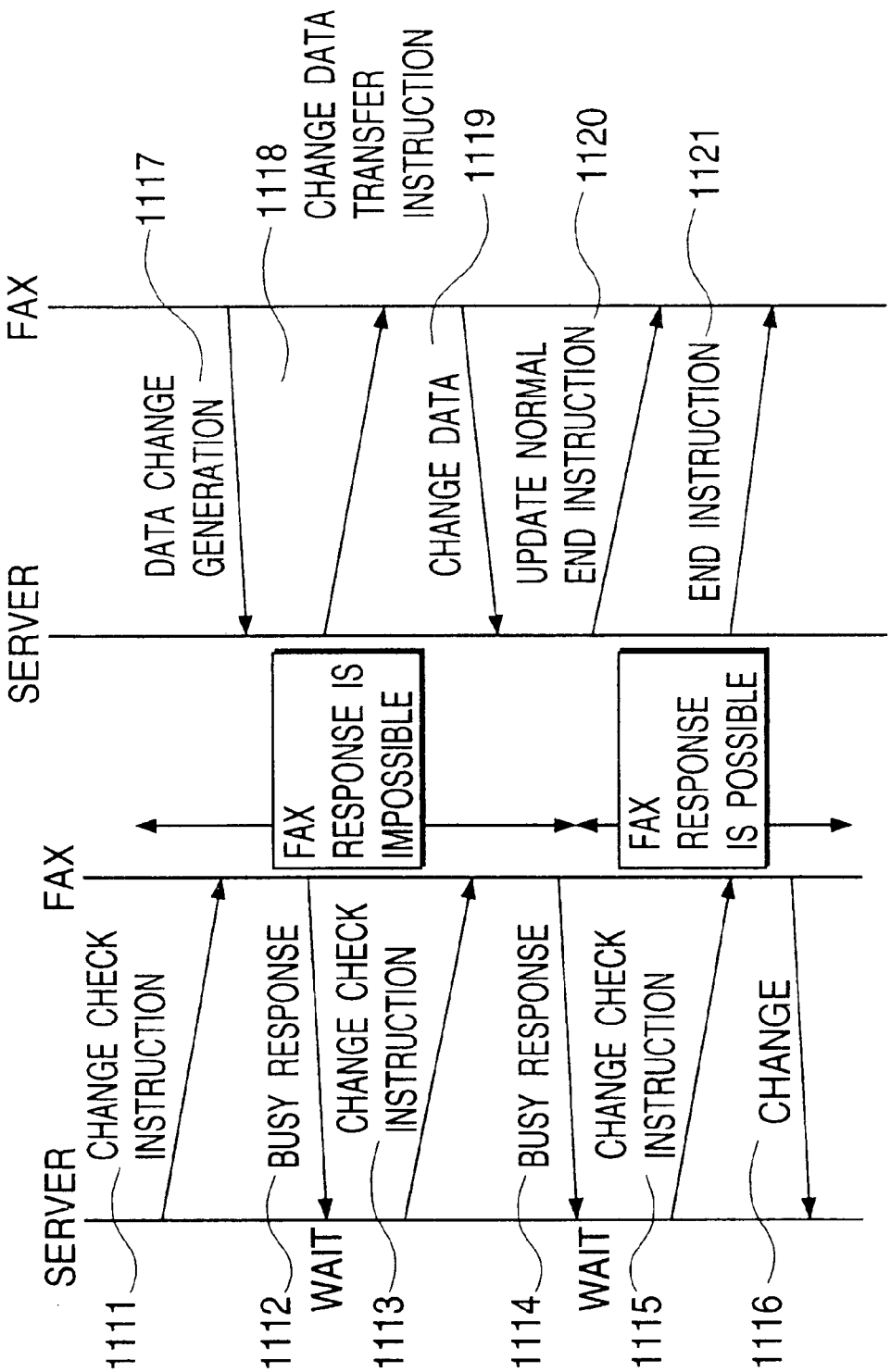

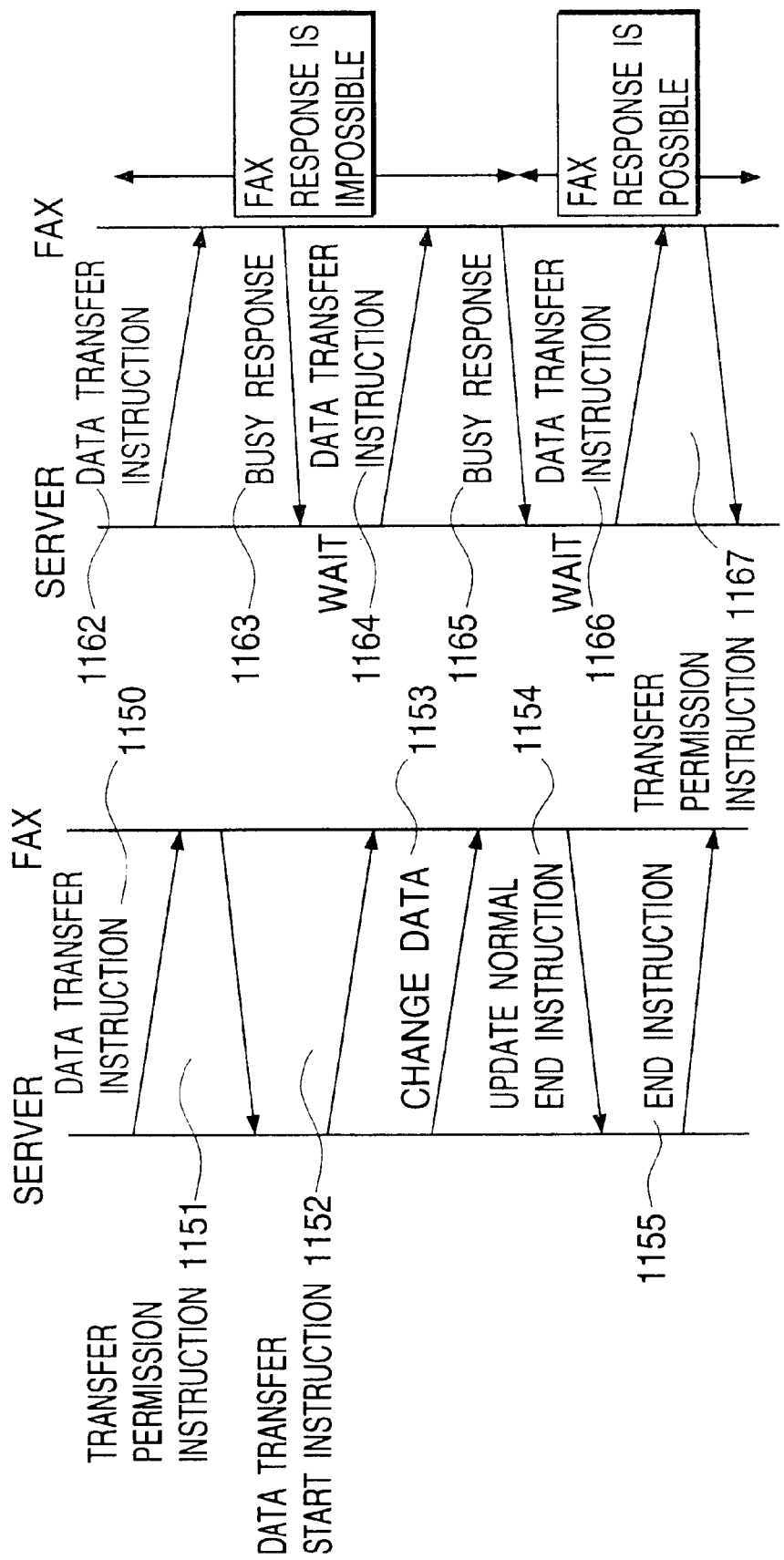

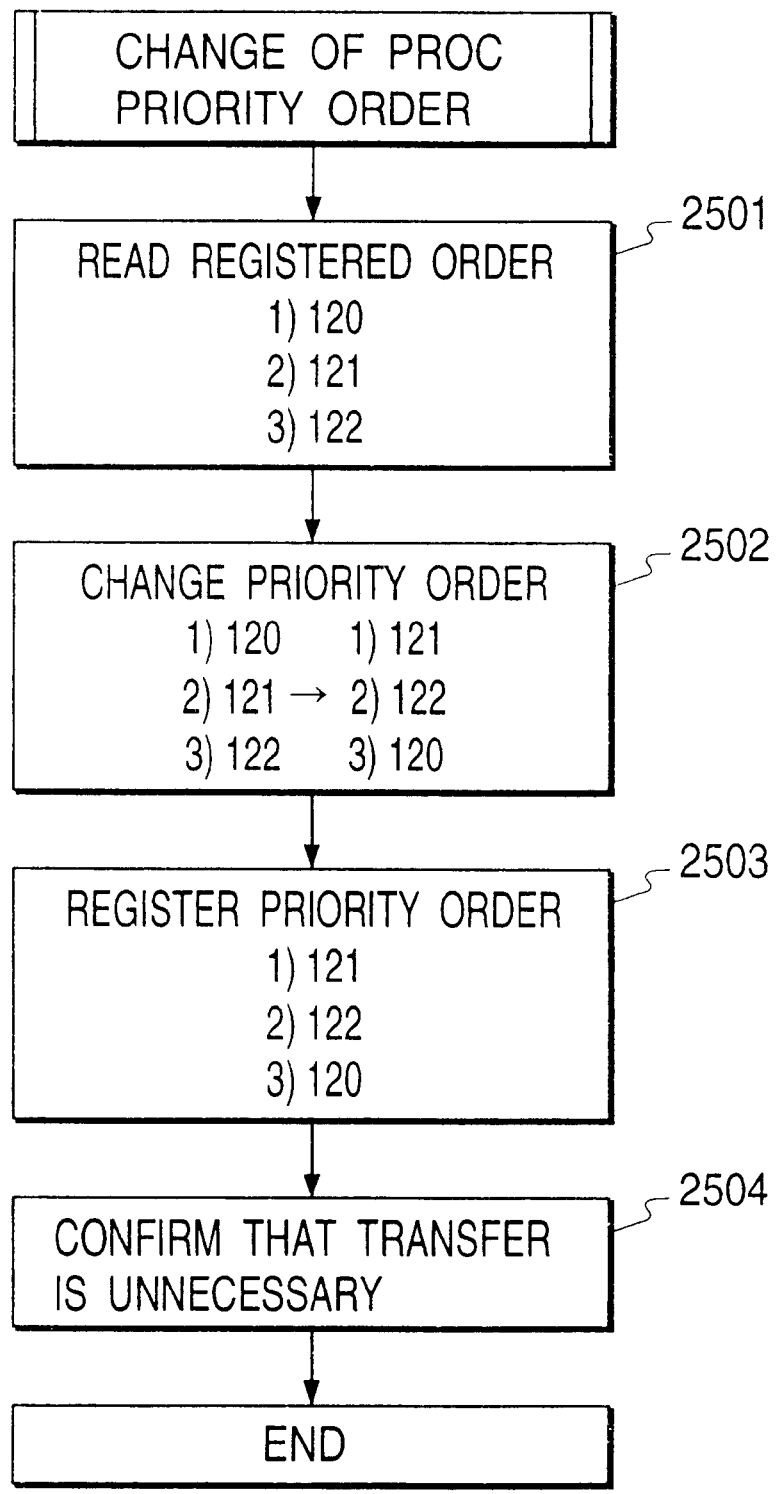

METHOD FOR TRANSMITTING SETTING INFORMATION BETWEEN AT LEAST TWO OF APPARATUSES

This is a continuation of application Ser. No. 08/717,544 filed Sep. 20, 1996 now U.S. Pat. No. 5,857,073 herein incorporated by reference.

BACKGROUND OF THE INVENTION

1. Field of the Invention

The present invention relates to a data communication apparatus for data transmission and reception and a data communication method, and more particularly to a data communication apparatus and method in which data is shared by a plurality of apparatuses.

2. Related Background Art

A data communication apparatus is known in which a computer connected to facsimiles remotely controls each facsimile and manages messages (image data) received by each facsimile from another communication apparatus.

If a facsimile and a computer have similar mail boxes (for storing in a memory each message transmitted from a transmission side by designating a box number and for managing messages in the memory), registration data under management of the mail box of a facsimile and received messages are transferred to the mail box of the computer to manage the messages thereat. In this case, the memory of the facsimile is prevented from becoming full of data, throughput of facsimile communications can be improved, and an operator of the computer can immediately check the information that at which mail box a message was received.

However, if such a mail box is provided at both the facsimile and computer and the setting contents (e.g., an ID number, a user name, or the like) are changed, for example, on the facsimile side, the setting contents on the computer side are also required to be changed. This work is cumbersome.

If errors are made during this work or the setting contents are entered erroneously at either the facsimile or computer, management and transfer of messages are impossible.

SUMMARY OF THE INVENTION

It is an object of the present invention to provide a data communication apparatus and method which solves the above problems.

It is another object of the present invention to provide a data communication apparatus and method allowing a plurality of apparatuses to share data.

It is another object of the present invention to provide a data communication apparatus and method capable of eliminating inconveniences to be caused by different data shared by a plurality of apparatuses.

It is another object of the present invention to provide a data communication apparatus and method capable of automatically changing registration data of one apparatus when registration data of another apparatus is changed.

The above and other objects of the invention will become apparent from the following detailed description when read in conjunction with the accompanying drawings.

BRIEF DESCRIPTION OF THE DRAWINGS

FIGS. 13A to 13D are diagrams illustrating data transfer protocols from the facsimile 120 to the facsimile server 118;

FIGS. 16A to 16D are diagrams illustrating data transfer protocols from the facsimile server 118 to the facsimile 120;

FIG. 25 is a flow chart illustrating a process to be executed by the facsimile server 118 when specific data to be registered by the facsimile server 118 is changed.

DETAILED DESCRIPTION OF THE PREFERRED EMBODIMENTS

Embodiments of the invention will be described in detail with reference to the accompanying drawings.

Figure 1:
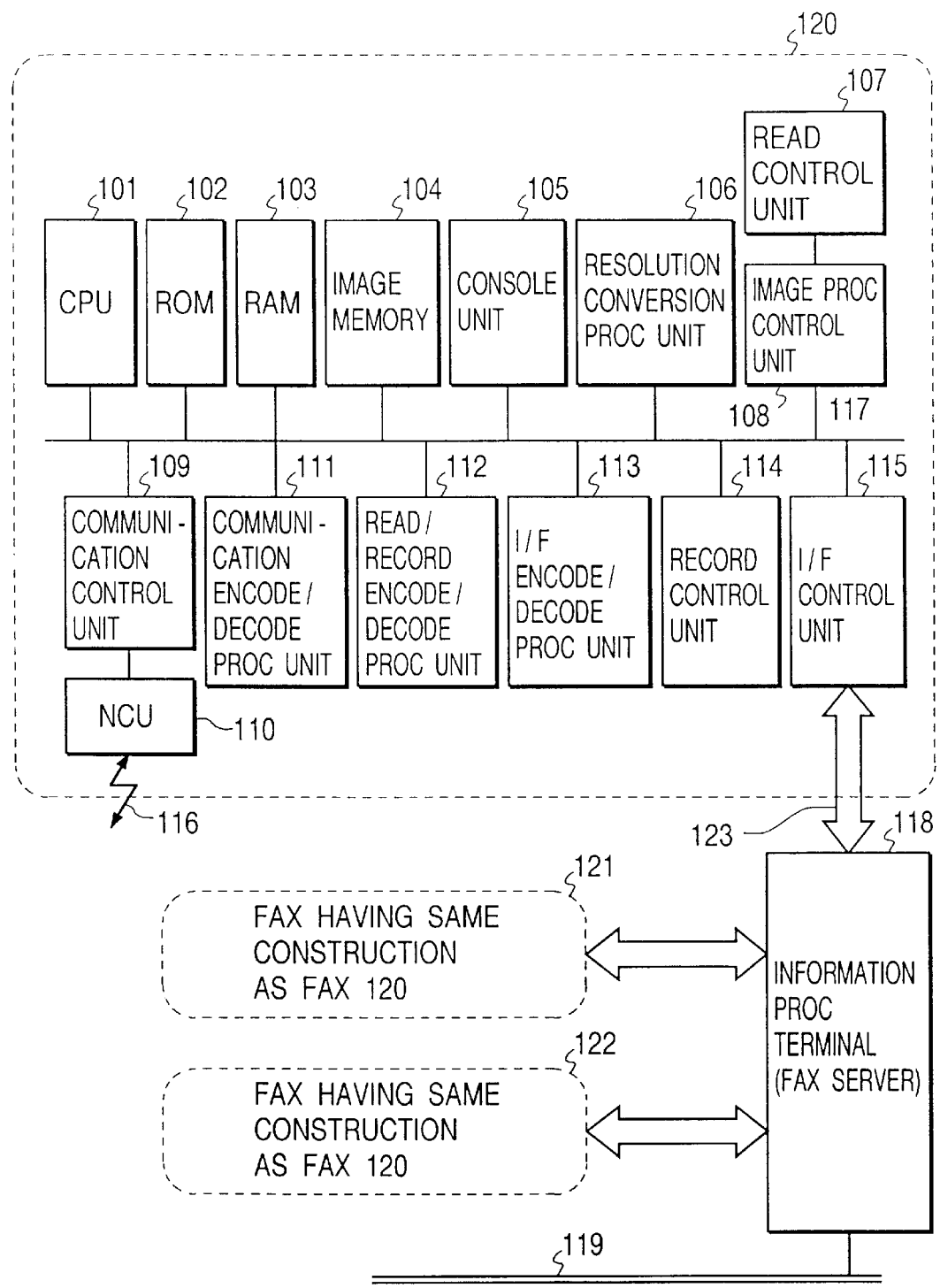
FIG. 1 is a block diagram showing the outline of the structure of a facsimile according to an embodiment of the invention.

FIG. 1 is a block diagram showing the outline of the structure of a facsimile according to the embodiment of the invention.

Referring to FIG. 1, a CPU 101 functions as a system control unit and controls the whole of a facsimile 120. A ROM 102 stores control programs and an operating system (OS) program to be used by CPU 101. A RAM 103 is constituted by an SRAM or the like and stores program control variables and the like. Values set by an operator and system management data are also stored in RAM 103, and various working buffers are formed in RAM 103. An image memory 104 is constituted by a DRAM or the like and stores image data. In this embodiment, it is assumed that each control program stored in ROM 102 controls software such as scheduling and task switching under the control of OS stored in ROM 102.

A console unit 105 is constituted by various keys, LEDs, an LCD, and the like and is used for various data inputs (registration data input, destination data input, and the like) and for display of an operation state of the facsimile.

A read control unit 107 is constituted by a CS image sensor, an original transport mechanism, and the like. The read control unit 107 optically reads an original with the CS image sensor and converts it into electrical image data which is subjected to various types of image processing such as a binary process and a half-tone process by an image processing control unit 108 to generate high quality image data. The processed image data is encoded by a read/record encode/decode processing unit 112 by a predetermined coding scheme and stored in the image memory 104.

A record control unit 114 is constituted by a page printer, a record image processing unit, and the like. The image data of the record control unit 114 decoded by the read/record encode/decode control unit 112 is subjected to various types of image processing such as a smoothing process and a record density correction process by the image processing control unit 108 to obtain high quality image data which is output by the page printer.

A communication control unit 109 is constituted by a modem (modulator/demodulator) and the like and modulates and demodulates a transmission/reception signal of the facsimile. An NCU (network control unit) 110 sends a selection signal (dial pulse or tone dial) to an analog communication line (PSTN), detects a call signal, and performs a line control such as an automatic reception control. Image data stored in the image memory 104 is decoded by a communication encode/decode processing unit 111 and subjected to a milli-inch resolution conversion process, an enlargement/reduction process, and the like by a resolution conversion processing unit 106. The resolution converted image data is decoded by the communication encode/decode processing unit 111 in accordance with the characteristics of a communication destination and is subjected to a transmission control process.

An I/F control unit 115 performs an interface control of an external information processing terminal (facsimile server) 118 connected by a cable 123. In this embodiment, it is assumed that this interface control is in conformity with parallel interface such as bi-directional Centronics interface. The facsimile server 118 is a computer connected to a LAN 119, receives data transmitted from an information processing terminal (client) on LAN 118, and acknowledges a remote control request such as a print process. The operation of the facsimile 120 can be controlled remotely upon activation by the facsimile server 118 itself.

The facsimile server 118 also manages a message (image data) received from a transmission side.

A remote control operation from the facsimile server 118 to the facsimile 120 such as data transmission, printing, and data registration is performed by transmitting preset commands, parameters, data, and the like to the facsimile 120 via the I/F control unit 115. In this embodiment, it is assumed that application software and driver software for the remote control operation and remote control operation request have already been installed in the facsimile server 118.

The facsimile server 118 manages a plurality of facsimiles 120, 121, and 122 and common or uncommon registration data to maintain data integrity between facsimiles and to give a manager or user an alarm notice when conflict occurs. The facsimile server 118 manages data of computers and facsimiles on LAN via LAN 119.

An I/F encode/decode processing unit 113 converts data so that the data becomes compatible with both the facsimile 120 and facsimile server 118.

The facsimiles 121 and 122 have the same structure as the facsimile 120.

A change in registration data of the facsimile 120 is notified from the facsimile server 118 to the facsimiles 121 and 122 or vice versa.

Data stored in RAM 102 includes data stored by the facsimiles 120, 121, and 122, data stored only by the facsimile server 118, and data stored by both the facsimiles 120, 121, and 122 and the facsimile server 118 connected to the facsimiles 120, 121, and 122. The data stored by both the facsimiles 120, 121, and 122 and the facsimile server 118 obviously includes different data for each facsimile 120 to 122.

The data stored by the facsimiles 120, 121, and 122 is mechanical data, electrical data, and software setting data specific to the facsimiles 120, 121, and 122 and not relevant to the facsimile server 118.

For example, the setting data includes a signal transmission level, a signal EQ level, a fastest transfer speed, and the like of the communication line 116 connected to the facsimile 120, dial setting data such as a tone/pulse dial switching data and a tone signal level, read position data and a read sensor threshold value of the read control unit 107 specific to the facsimile 120, and print position data and print density data of the record control unit 114.

Data managed by the facsimile server 118 includes connection procedure data of LAN, client ID data, communication management data of the whole system, and data necessary for the system management such as priority order data for broadcast transmission to a plurality of facsimiles connected to LAN.

Data managed by both the facsimiles 120, 121, and 122 and facsimile server 118 includes the common data shared by all the facsimiles and different data stored by each facsimile.

For example, one-touch abbreviated dialing list information and each destination dial number information freely usable by each user is the data usable by any of the facsimiles 120, 121, and 122 and the data which does not affect the communication operation of each facsimile even while the power of the facsimile server 118 is turned off.

The common data is managed also by the facsimile server 118 so that the facsimiles 120, 121, and 122 under the management of the facsimile server 118 can use the common data, and if any change in the common data occurs at some facsimile, this changed common data is transferred to the other facsimiles.

If any change in registration data occurs at the facsimile server 118, this changed data is also transferred to the facsimiles 120, 121, and 122.

Figure 2:
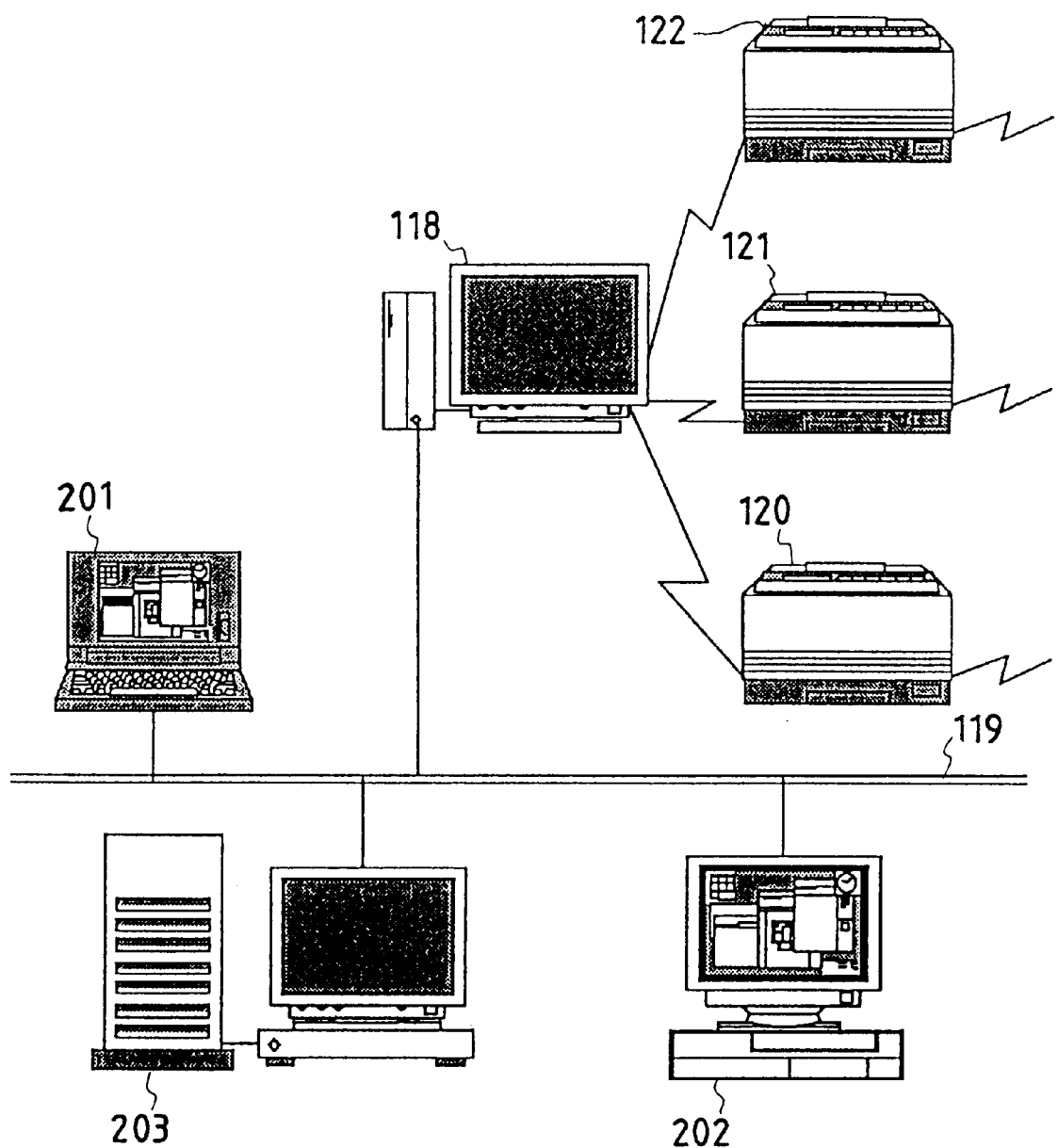
FIG. 2 is a diagram showing a network system in which facsimiles shown in FIG. 1 are connected to a LAN.

FIG. 2 shows an example of the network configuration of a LAN 119 connecting the facsimiles 120, 121, and 122 and the facsimile server 118 shown in FIG. 1.

In FIG. 2, reference numerals 201 and 202 represent a client machine (terminal) which generates text data, image data, or the like to transfer it via LAN 119 to each terminal or requests the facsimile server 118 to transmit data from any one of the facsimiles 120, 121, and 122. The client machine can access a mail box (to be later described) in the memory of the facsimile server 118 and receive a message from any one of the facsimiles 120, 121, and 122. Reference numeral 203 represents a file server which has a large capacity memory area and manages files and protocols of LAN 119.

Figure 3:
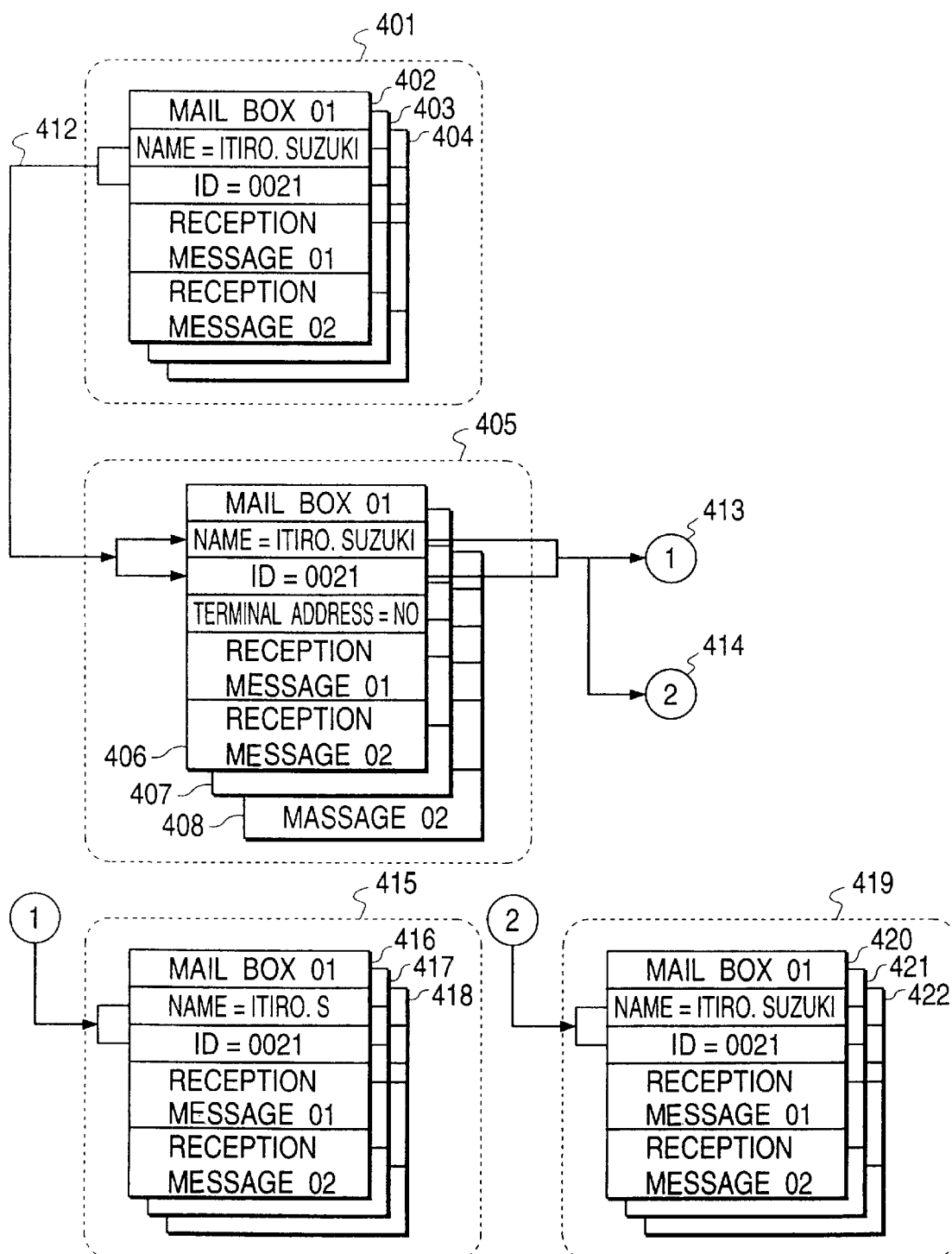
FIG. 3 illustrates a flow of setting data at a mail box of a facsimile 120.

FIG. 3 illustrates a flow of registration data of the setting contents in the main box changed by the facsimile 120.

Reference numeral 401 represents a mail box group in RAM 103 of the facsimile 120 at predetermined areas, the registration data in the main box being changed as desired. The mail box group 401 has mail box areas 402, 403, and 404. In the mail box area 402, registration data and reception messages changed by a user are stored in the mail box of the facsimile 120.

The contents of the mail box are assumed herein to be a mail box number (mail box 01), a changed user name (NAME=ITIRO. SUZUKI), a changed identification ID (ID=0021), and addresses of reception facsimile messages reception messages 01 and 02).

In sending a message from a transmission side to a particular reception side, the mail box number is first designated. The facsimile 120 received the facsimile message writes an address in the reception message area of the designated mail box, and stores the message in the image memory 104 at the address. This message is transferred to the mail box in the internal memory (or external hard disk) of the facsimile server 118, upon request by the facsimile server 118 by using the user name and identification ID.

If the mail box is not designated, the facsimile 120 print outs the reception message at the record control unit 114.

Reference numerals 403 and 404 represent other mail boxes of the facsimile 120.

Reference numeral 405 indicates a simple structure of a memory group in the memory managed by the facsimile server 118 connected to the facsimile 120 whose registration data can be changed.

The mail box group 405 has mail box areas 406, 407, and 408.

In the mail box area 406, a registration data structure is stored in the mail box of the facsimile server 118, the registration data structure being updated in accordance with the registration data in the mail box 401 of the facsimile 120 which the user changed.

The contents of the mail box 406 are assumed herein to be a changed mail box number (mail box 01), a changed user name (NAME=ITIRO. SUZUKI), an identification ID (ID=0021), and facsimile messages (reception messages 01 and 02) transferred from the image memory 104 in the mail box 402 of the facsimile 120 to an external terminal with an address (terminal address=NO) to which a message reception is notified. In this case, since the terminal address is "NO", a message reception is not notified to an external terminal, but the external terminal itself checks a message reception.

The registration data structure and contents are not limited to the above.

Reference numerals 407 and 408 represent other mail boxes in the facsimile server 118.

A line 412 indicates that the e changed registration data in the mail box 402 is transferred to the mail box 406 in the registration data area.

Reference numeral 415 represents a mail box group of the facsimile 121 whose contents are changed in accordance with a change in registration data in the mail box 406 of the facsimile server 118.

The mail box group 415 has mail box areas 416, 417, and 418.

Reference numeral 416 indicates a simple structure of registration data and reception messages in the mail box of the facsimile 121 whose contents are changed.

The contents of the mail box 416 are assumed herein to be a mail box number (mail box 01), a changed user name (NAME=ITIRO. S), a changed identification ID (ID=0021), and addresses of reception facsimile messages (reception messages 01 and 02).

The user name changes from "ITIRO. SUZUKI" to "ITIRO. S" because of the structure difference between the change originating mail box 406 and change destination mail box 416.

The registration data structure and contents are not limited to the above.

Reference numerals 417 and 418 represent other mail boxes in the facsimile 121.

A line 413 indicates that the changed registration data in the mail box 406 is transferred to the mail box 416 in the registration data area.

Reference numeral 419 represents a mail box group of the facsimile 122 whose contents are changed in accordance with a change in registration data in the mail box 406 of the facsimile server 118.

Reference numeral 420 indicates a simple structure of registration data and reception messages in the mail box of the facsimile 122 whose contents are changed.

The contents of the mail box 420 are assumed herein to be a mail box number (mail box 01), a changed user name (NAME=ITIRO. SUZUKI), an identification ID (ID=0021), and addresses of reception facsimile messages (reception messages 01 and 02).

The user name of "ITIRO. SUZUKI" is registered because of the same structures of the change originating mail box 406 and change destination mail box 420.

The registration data structure and contents are not limited to the above.

Reference numerals 421 and 422 represent other mail boxes in the facsimile 122.

A line 414 indicates that the changed registration data in the mail box 406 is transferred to the mail box 420 in the registration data area.

A flow of data from the facsimile 120 whose registration data can be changed to the facsimile server 118 (information processing terminal) will be described.

In this example, it is assumed that the user name and identification ID registered in the mail box are changed.

1) A user of the facsimile 120 changes registration data and the like in RAM 103 by using the console unit 105 in a registration change mode of a function mode.

The registration change mode of the facsimile 120 performs the same operation as a facsimile performs singularly when it is not connected to LAN, to thereby make it easy to use.

Other operations may be used if new registration data generated upon connection to the facsimile server 118 is to be set to the facsimile 120.

The registration data to be changed includes not only the data stored in the facsimile 120, but also data in the facsimile server 118 and the common data stored both in the facsimile 120 and facsimile server 118.

In changing the data in the facsimile server 118, the necessary data is transferred in advance to the facsimile 120.

The data in the mail box 402 shown in FIG. 3 is changed by the user from the original data (user name of NAME=I. SUZUKI and identification ID=0059) to the new data (user name of NAME=ITIRO. SUZUKI and identification ID=0021).

The changed data is set from the console unit 105 such as a keyboard. The data may be changed in the following manner without using the console unit 105.

a) A mark sheet or the like is read with the read control unit 107 and processed by the read image processing control unit 108. Thereafter, the image information stored in the image memory 104 is analyzed by CPU 101. If the analyzed data is judged to be registration data, it is stored in RAM 103.

b) Registration change data received from an external information processing terminal via the communication line 116 is supplied via NCU 110 to the communication control unit 109 which analyzes this information.

The analyzed information is further analyzed by CPU 101, and if it is judged to be registration data, it is stored in RAM 103.

The communication protocol of the communication line may be a specific protocol or a known protocol such as binary file transfer.

Signals supplied via the communication line 116 may be voices or tone signals if the communication control unit 120 and CPU 101 can analyze them.

2) Transfer of registration data between the facsimile server 118 and facsimile 120 may be activated when a notification of a registration data change from the facsimile 120 is confirmed by the facsimile server 118, when a periodical trigger of a timer setting of the facsimile server is generated, or when the facsimile server 118 becomes necessary to check the registration data of the facsimile 120.

A trigger signal for transferring registration data from the facsimile 120 is supplied via the I/F control unit 115 to the facsimile server 118.

Generation of a transfer start timing and a transfer start trigger signal may be performed either by the facsimile 120 or by the facsimile server 118.

3) Upon reception of the transfer trigger signal from the facsimile 120, the computer 118 receives the registration data changed by the facsimile 120 via the I/F control unit 115 of the facsimile 120.

The changed registration data in the mail box 402 may be only the user name and ID, all registration data in the mail box 402, or all registration data in the mail boxes 402, 403, and 404.

4) Upon reception of the registration data from the facsimile 120, the facsimile server 118 checks the data and updates the registration data in the facsimile server 118 after the data is converted into the format matching the facsimile server 118.

The registration data may be transferred after it is converted by the facsimile 120 into the format matching the facsimile server 118 or after it is converted by the I/F encode/decode processing unit 113 into the format compatible with both the facsimile 120 and facsimile server 118.

5) The facsimile server 118 checks the changed data whether it is associated with the connected facsimiles 121 and 122. If associated, the changed data in the mail box 406 is converted into the format matching the facsimiles and transferred to the facsimiles.

The facsimiles 121 and 122 change the contents of the mail boxes 416 and 426 at the registration data areas in accordance with the received data.

Data transfer to the facsimiles 121 and 122 is the same as the data transfer from the facsimile 120 to the facsimile server 118.

6) The facsimiles 121 and 122 transfer the changed registration data to the facsimile server 118, if necessary.

7) After the facsimile server 118 checks the changed results in the facsimiles 121 and 122 and the updated registration data in the facsimile server 118, the changed registration data is stored in a history file if necessary.

The facsimile server 118 notifies the facsimile 120 of the updated registration data if necessary.

Upon reception of a notification of the updated registration data in the facsimile server 118, the facsimile 120 displays the updated results on the console unit 105 with a display function, notifies a user of the updated registration data by printing it out at the record control unit 114 with a print function, or notifies it to external information processing terminals via the communication control unit 109, NCU 110, and communication line 116.

The facsimile server 118 may notify a manager of the updated registration data or other terminals of the data via LAN 119 if necessary.

Registration data may be transferred in the opposite direction to the above from the facsimile server 118 to facsimile 120 if necessary.

Even if the registration data converted at the facsimile 120 cannot be transferred to the facsimile server 118 because of its system down, communications between facsimiles can be established by using changed registration data in the facsimile 120, and after the facsimile server 118 operates thereafter normally, the changed registration data and reception messages are transferred to the facsimile server 118.

In this manner, even if the facsimile server 118 is in a system down state, the registration data can be converted at the facsimile 120 and communications can be established using the changed data.

The facsimile server 118 always monitors data conflict among the facsimiles 120, 121, and 122.

Such a conflict may be caused by different names registered in the same mail box of a user.

Figure 4:
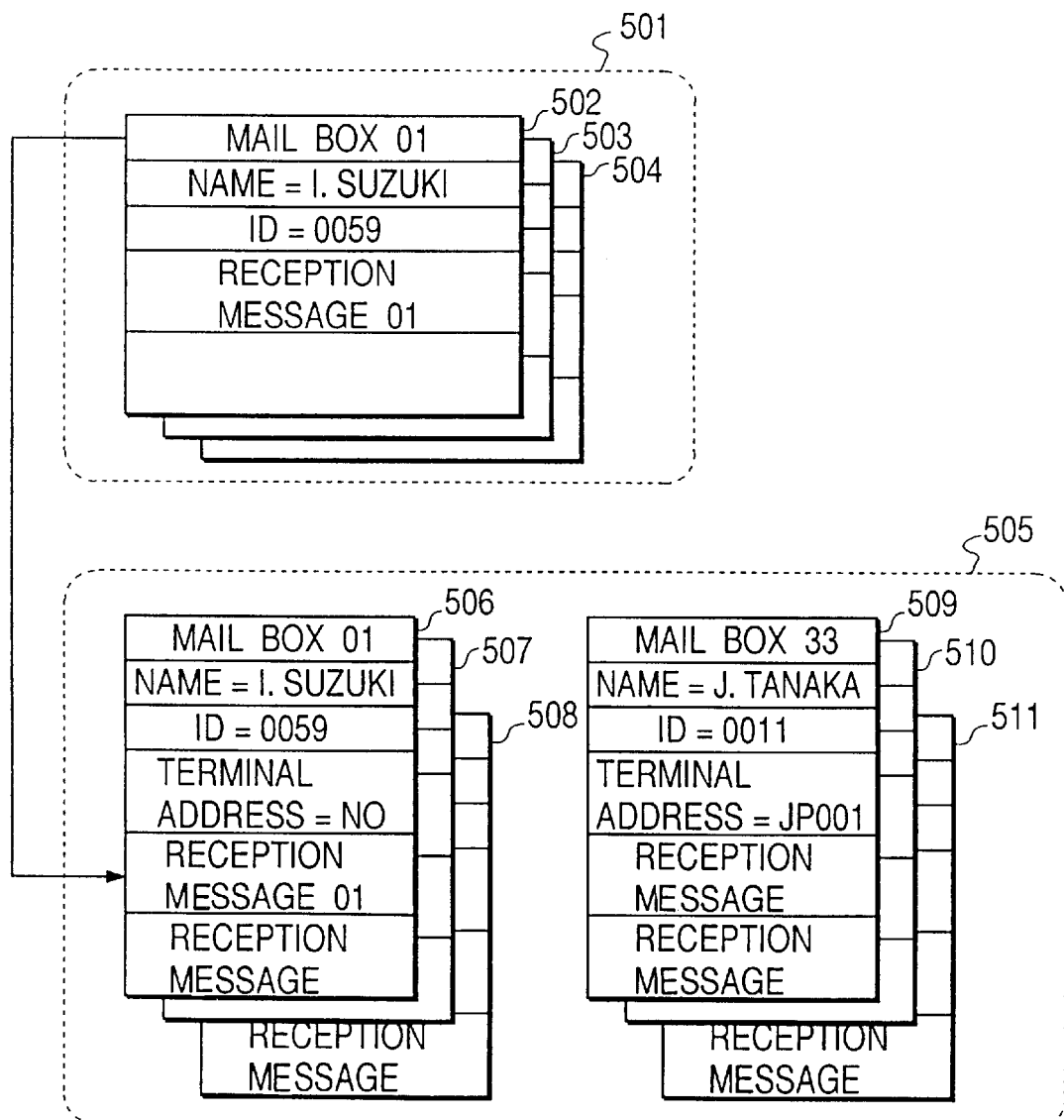
FIG. 4 illustrates a flow of a message received by the facsimile 120 and transferred to a mail box of a facsimile server 118.

FIG. 4 illustrates an example of using mail boxes wherein a reception message at the facsimile 120 is transferred to the facsimile server 118 and stored in the main box at the destination.

RAM 103 of the facsimile 120 has a mail box group 501 with mail boxes 502, 503, and 504 for respective users. The facsimile 120 and facsimile server 118 are connected by I/F for data transfer therebetween.

The facsimile server 118 has a memory such as a hard disk which has a mail box group 505 for storing reception messages. The mail box group 505 has mail boxes 506, 507, 508, 509, 510, and 511 for respective users. Data read/write from and to the mail boxes is permitted after discriminating between mail boxes in accordance with the user name, identification ID, and the like.

A flow of data transferred from the facsimile 120 to the mail box of the facsimile server 118 will be described.

1) A message with information such as an identification ID "0059" is sent from a partner facsimile to the facsimile 120 via the communication line. Image data in the received message is stored in the image memory 104. 2) The facsimile 120 stores the reception message 01 and the address of the image memory 104 storing the image data, in the mail box 502 with the box number of 01 identified by the received identification ID "0059".

3) The facsimile server 118 checks a presence of reception data at the facsimile 120 at a predetermined time interval. If there is reception data, the facsimile server 118 instructs the facsimile 120 to transfer the reception data.

The facsimile 120 adds data such as the identification ID in the mail box 502 to the data corresponding to the reception message 01 and sends it to the facsimile server 118.

4) Upon reception of the reception message, the facsimile server 118 stores it in the mail box 506 with the box number of 01 identified by the identification ID added to the message.

Both the facsimile 120 and facsimile server 118 are required to have discrimination data such as correct IDs in order to transfer the reception message in the mail box of the facsimile 120 to the correct mail box of the facsimile server 118.

The message stored in the mail box of the facsimile server 118 is accessed via LAN 119 or the like by another terminal. In this case, permission of an access to the mail box of each user is judged from the identification ID, terminal address, name, and the like so that only the authenticated user can access the message.

By registering names and identification IDs in the facsimile 120, it is not necessary to request the facsimile server 118 to confirm the partner terminal each time communications are established.

Even if the facsimile server 118 does not operate normally (power off, busy because of other tasks of the computer, insufficient memory for messages), the facsimile 120 can establish communications, store data, and perform data transfer after the facsimile server 118 resumes its operation.

Figure 5:
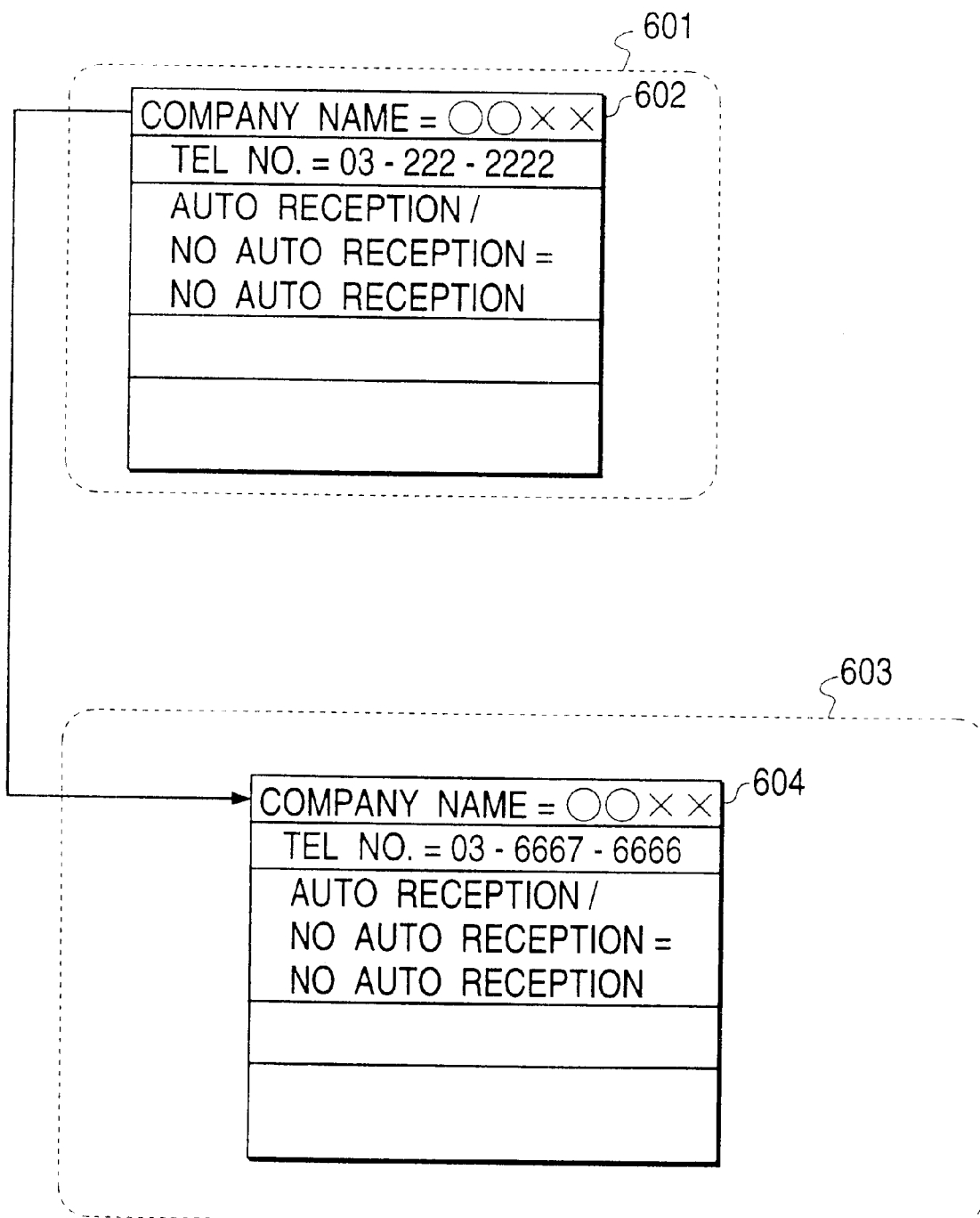
FIG. 5 illustrates a flow of registration data specific to the facsimile 120 when it is changed.

FIG. 5 illustrates a flow of changed registration data specific to the facsimile 120.

Reference numeral 601 represents a data group in RAM 103 of the facsimile 120 whose registration data can be changed.

The data group 601 has a data group 602 (hereinafter called a general data group 602) for storing general data sets for respective terminals.

The general data group 602 stores setting data, for example, a company name, a connection telephone number, and auto reception/no auto reception.

Reference numeral 603 represents a data group managed by the facsimile server 118 connected to the facsimile 120.

The data group 603 of the facsimile server 118 has a data group 604 (hereinafter called a general data group 604) for storing general data sets for respective facsimiles. The general data group 604 stores general data of the facsimile 120.

The general data groups 602 and 604 are used as confirmation data of the facsimile when a partner is checked through a protocol over the telephone line, or used for reception/transmission setting by the computer.

The confirmation data (such as a company name and a telephone number) in the general data groups 602 and 604 is added to the image information at the facsimile or computer in the form of images, if necessary, or is used for automatic generation of the first page of transmission data as a dispatch note.

The structure, contents, and usage of the general data groups are not limited to the above.

A flow of general data from the facsimile 120 with a registration data change function to the facsimile server 118 will be described.

1) As a user of the facsimile 120 changes in the registration mode the registration data to "TEL. NO.=03-222-222" and "AUTO RECEPTION/NO AUTO RECEPTION=NO AUTO RECEPTION", by using the console unit 105, the corresponding data in the general data group 602 is changed.

As in the manner described with FIG. 3, changing the general data of the facsimile 120 may be performed in various ways.

2) Transfer of registration data between the facsimile server 118 and facsimile 120 may be activated when a notification of a general registration data change from the facsimile 120 is confirmed by the facsimile server 118, when a periodical trigger of a timer setting of the facsimile server is generated, or when the facsimile server 118 becomes necessary to check the general registration data of the facsimile 120.

A trigger signal for transferring general registration data from the facsimile 120 is supplied via the I/F control unit 115 to the facsimile server 118.

Generation of a transfer start timing and a transfer start trigger signal may be performed either the facsimile 120 or the facsimile server 118.

3) Upon reception of the transfer trigger signal from the facsimile 120, the facsimile server 118 receives the general registration data changed by the facsimile 120 via the I/F control unit 115 of the facsimile 120.

The general registration data transferred from the facsimile 120 may be only the telephone number and auto reception in the general data group 602, or all general registration data in the general data group 602.

4) Upon reception of the general registration data from the facsimile 120, the facsimile server 118 checks the data and updates the general registration data in the facsimile server 118 after the general data is converted into the format matching the facsimile server 118.

The general registration data may be transferred after it is converted by the facsimile 120 into the format matching the facsimile server 118 or after it is converted by the I/F encode/decode processing unit 113 into the format compatible with both the facsimile 120 and facsimile server 118.

5) The facsimile server 118 checked and updated the general data stores it in a history file if necessary.

If necessary, the changed results are displayed to notify the user of the change or the changed results are recorded in a change report.

Since the changed general data is specific to the facsimile 120, it is not transferred to the other facsimiles 121 and 122.

Figure 6:
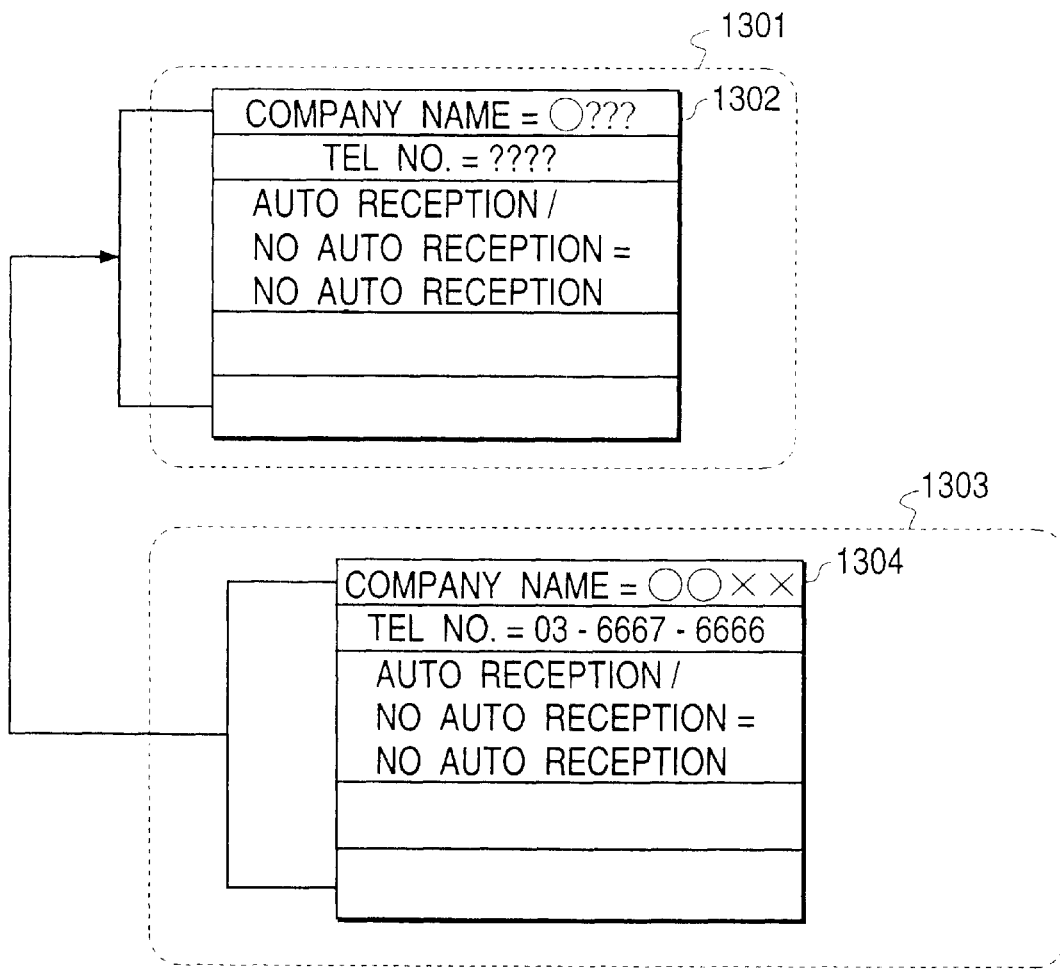
FIG. 6 illustrates a flow of registration data specific to the facsimile 120 when it is again set by the facsimile server 118.

FIG. 6 illustrates a flow of general data in the facsimile server 118 for setting again the general data of the facsimile 120 illustrated in FIG. 5.

A data group 1301 of the facsimile 120 has data 1302 (hereinafter called general data 1302) for storing general data sets for respective terminals.

If the general data of the facsimile 120 is broken from some reason, the data is transferred from the general data 1304 of the facsimile server 118 to set again the general data 1302 to the facsimile 120.

The general data is setting data such as a company name, a telephone number,and automatic reception/no automatic reception.

Reference numeral 1303 represents a data group of the facsimile server 118 connected to the facsimile 120.

The data group 1303 of the facsimile server 118 has a data (hereinafter called general data) 1304 for storing general data sets for respective terminals.

A flow of general data set again to the facsimile by using the general data of the facsimile server will be described.

1) The facsimile server 118 checks whether the company name or telephone number in the general data 1302 of the facsimile 120 takes an abnormal value "???", based upon periodical communications (polling) with the facsimile 120 or based upon a notification of occurrence of an abnormal state from the facsimile 120.

2) The facsimile server 118 transfers the general data 1304 to the facsimile 120.

3) The facsimile 120 sets again the general data 1302 by using the transferred data.

4) The facsimile 120 notifies a user of the new setting of the general data or stores it in the history file, if necessary.

Contrary, if the general data 1304 of the facsimile server 118 is broken, the general data 1302 of the facsimile 120 is transferred so that the facsimile server 118 sets again the general data 1304.

The general data is stored in both the facsimile 120 and facsimile server 118, this contributing to system safety.

This is also true for the case of data reproduction when the data in the mail box group 401 of the facsimile 120 is broken. In this case, the data of the mail box group 405 is transferred from the facsimile server 118 to set again the mail box group 401.

Figure 7:
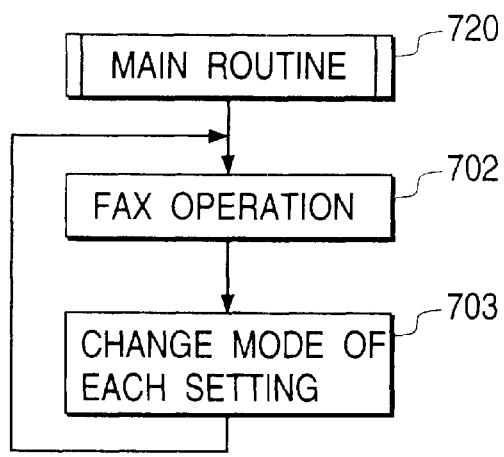
FIG. 7 is a flow chart illustrating a process of transferring data from the facsimile 120 to the facsimile server 118, the process being executed by the facsimile 120.
Figure 8:
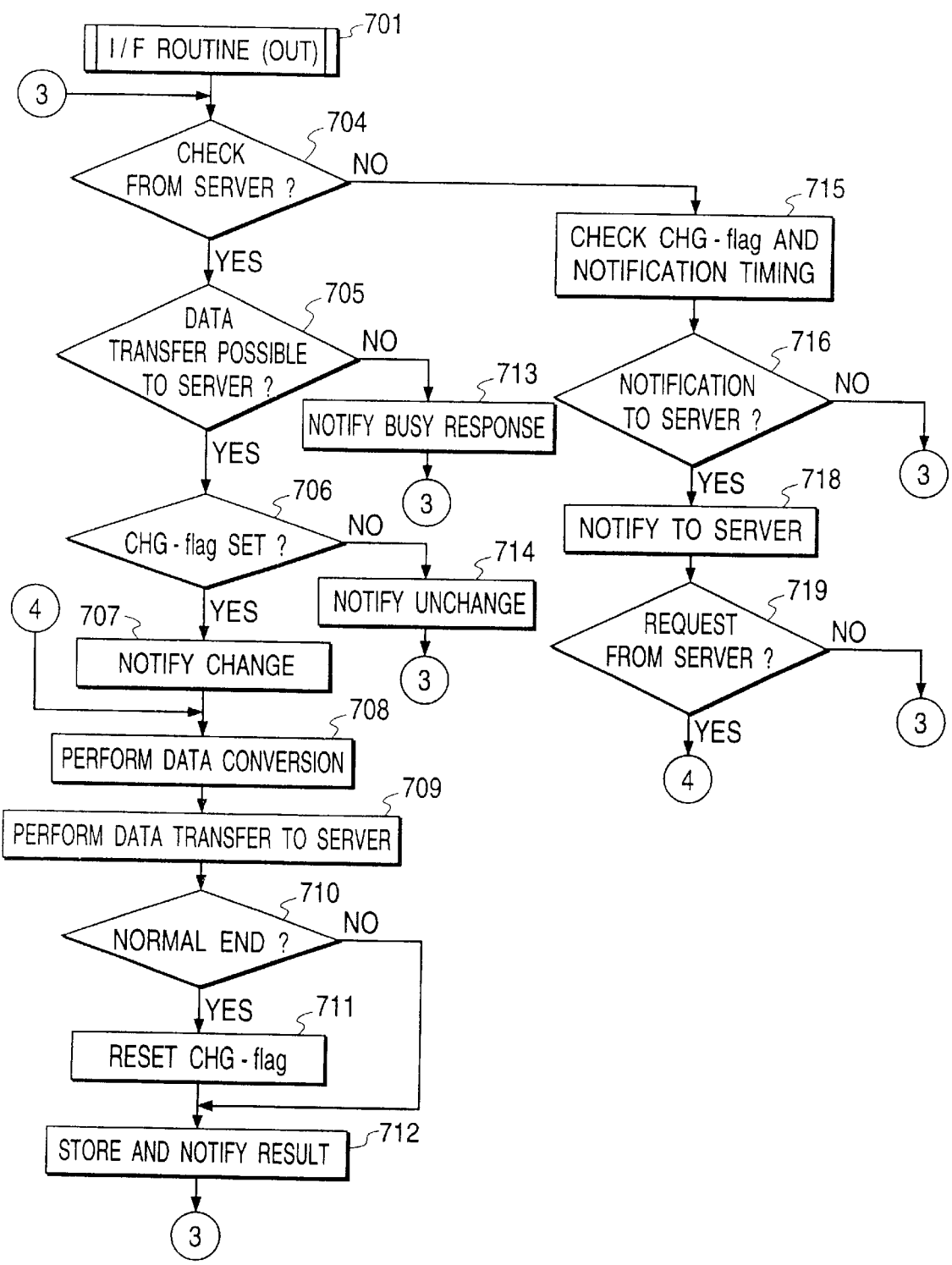
FIG. 8 is a flow chart illustrating a process of transferring data from the facsimile 120 to the facsimile server 118, the process being executed by the facsimile 120.

FIGS. 7 and 8 are flow charts illustrating the operation of the facsimile 120 when data is transferred from the facsimile 120 to the facsimile server 118.

The data transfer process by the facsimile 120 will be described in detail.

Data transfer programs execute in parallel both the main routine 720 shown in FIG. 7 and the I/F routine 701 shown in FIG. 8.

The main routine 720 alternately executes a facsimile operation 702 for transmission, reception, scanning, and printing and a setting change mode 703 for setting various types of data.

The details of the setting data change mode will be given with reference to FIG. 9. The main function of the setting data change mode is to set a "CHG-flag" when a data change occurs.

The I/F routine 701 is always running for data transfer to and from the facsimile server 118.

In this example, transfer of registration data from the facsimile 120 to the facsimile server 118 will be detailed.

Data such as reception and transmission messages is actually transferred between the facsimile server and facsimile when necessary in practice.

In the I/F routine, at step 704 it is checked whether there is a check such as a setting change check from the facsimile server 118 (whether it is necessary to transfer data to the facsimile server 118).

If an inquiry for a change is received from the facsimile server 118 at step 704, it is checked at step 705 whether it is possible at present to transfer data to the facsimile server 118. This check judges whether the facsimile 120 is busy in communications with another facsimile or whether the facsimile is now changing the registration mode and unable to transfer data to the facsimile server 118.

If the data transfer is not impossible at step 705, a BUSY signal is returned to the facsimile server 118 and the flow returns to step 704 to wait for the next check of a change by the facsimile server 118.

If it is judged at step 705 that a response to the facsimile server 118 is possible, the "CHG-flag" is checked at step 706.

The "CHG-flag" is being set to "1" (a change) if the registration data (registration data in the mail box and general data such as a company name, telephone number, automatic reception/no automatic reception, and the like) shared with the facsimile server 118 is changed, and is being reset to "0" (an unchange) if the data is not changed.

If the "CHG-flag" is reset to "0" at step 706, the facsimile server 118 is notified (unchange notification) at step 714 that there is no transfer data (changed registration data) and the flow returns to step 704 to wait for a check from the facsimile server 118.

If the "CHG-flag" is set to "1" at step 706, the facsimile server 118 is notified (change notification) at step 707 that there is data to be transferred to the facsimile server 118.

Thereafter, at step 708 the data is converted into the format matching the facsimile server 118, and at step 709 the converted data is transferred to the facsimile server 118.

After the data transfer at step 709, a reception end notification and data check results are received from the facsimile server 228, and at step 710 it is checked whether the data transfer was normally completed.

If normally completed, the "CHG-flag" is reset to "0" at step 711, and necessary data is left and unnecessary data is deleted to prepare for the next change.

If abnormally completed, the state of the "CHG-flag" is not changed to prepare for the next data transfer.

After the data transfer, the data transfer results are stored in RAM 103 in a history file so as to allow the transfer results to be checked later, or the transfer results are displayed at the console unit 105 or printed out at the record control unit 114 to notify a user of the transfer results, at step 712. The transfer results may be notified to an external terminal via the I/F control unit 115.

Thereafter, the flow returns to step 704 to wait for the next check by the facsimile server 118.

If there is no check of a change from the facsimile server 118 at step 704, the "CHG-flag" and notification timing are checked at step 715.

The details of checking the "CHG-flag" and notification timing at step 715 will be given later with reference to FIG. 10.

In checking the "CHG-flag" and notification timing at step 715, it is judged whether the facsimile 120 itself voluntarily notifies the facsimile server 118 of an occurrence of setting change. In this case, generally in response to a check of a change by the facsimile server 118, a presence/absence of a change is notified (with polling communications), and although the facsimile 120 itself does not voluntarily notify the facsimile server 118 of the change, the facsimile 120 is adapted through presetting to notify the facsimile adapter 118 of the change.

If it is judged at step 716 that the facsimile 120 itself voluntarily notifies the facsimile server 118, at step 718 the facsimile server 118 is notified of a change in registration data in accordance with the check at step 715.

If it is judged at step 716 that the facsimile 120 itself is not necessary to voluntarily notify the facsimile server 118, the flow returns to step 704 to wait for the next instruction from the facsimile server 118.

If there is a data transfer request from the facsimile server 118 at step 719, the flow moves to step 708 for the data transfer.

If there is no data transfer request from the facsimile server 118 at step 719, the flow returns to step 704 to wait for the next instruction from the facsimile server 118.

Figure 9:
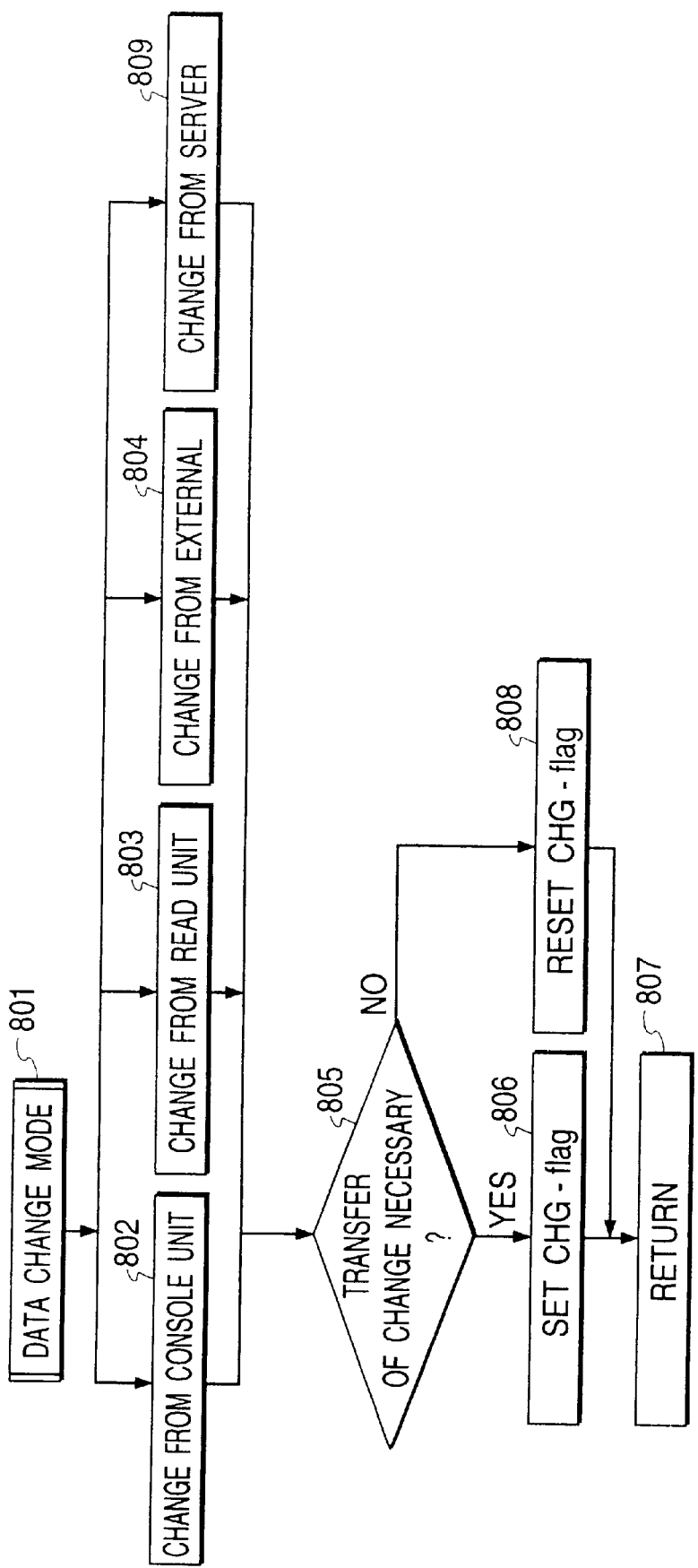
FIG. 9 is a flow chart illustrating a process of changing registration data at the facsimile 120.

FIG. 9 is a flow chart illustrating a registration data change process of the facsimile 120.

The details of the registration data change process by the facsimile 120 will be given.

Figure 11:
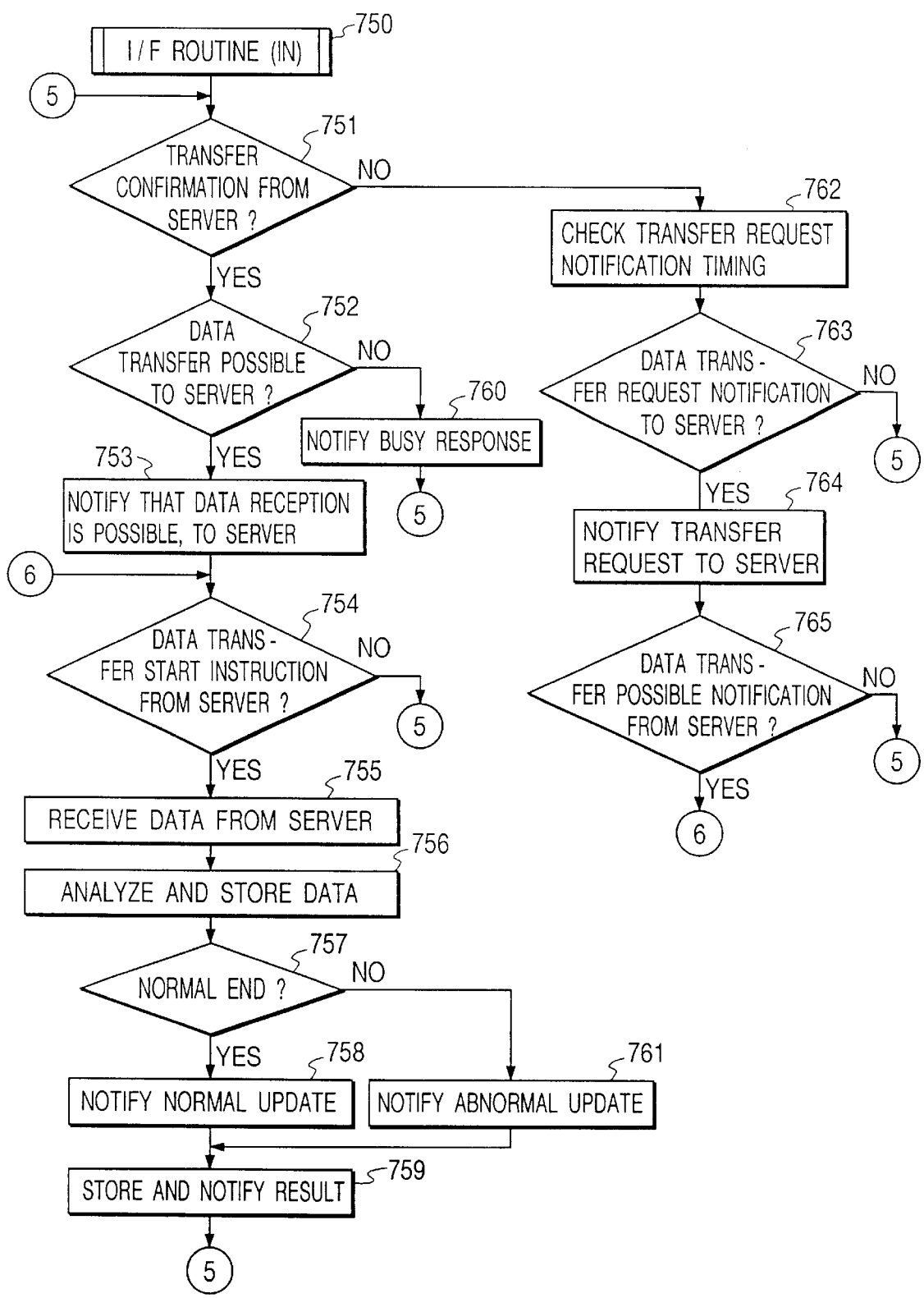
FIG. 11 is a flow chart illustrating a process of transferring data from the facsimile server 118 to the facsimile 120, the process being executed by the facsimile 120.

The registration data change process is performed when the registration data is changed in the change mode at step 703 shown in FIG. 7 or when the registration data is transferred from the facsimile server 118 illustrated in FIG. 11.

Changing the registration data is performed by a change 802 from the console unit 105, a change 803 from the read control unit 107 (reading a mark sheet or the like recorded with the change contents with the read control unit 107 and analyzing the read data) or by a change 804 from an external terminal (a change from an external terminal via the communication line 116 or other I/F units).

The change is also performed by the transfer of changed data from the facsimile server 118.

When the data is changed in one of the above manners, it is judged at step 805 whether an occurrence of a change in the registration data or the changed data is to be notified to the facsimile server 118.

If it is judged that there is the changed data to be notified to the facsimile server 118, the "CHG-flag" is set to "1" at step 806 so that the change can be notified when there is a check of the change from the facsimile server 118.

If it is judged there is no changed data to be notified, the "CHG-flag" is set to "0" at step 808 so that the unchange can be notified when there is a check of the change from the facsimile server 118.

Figure 10:
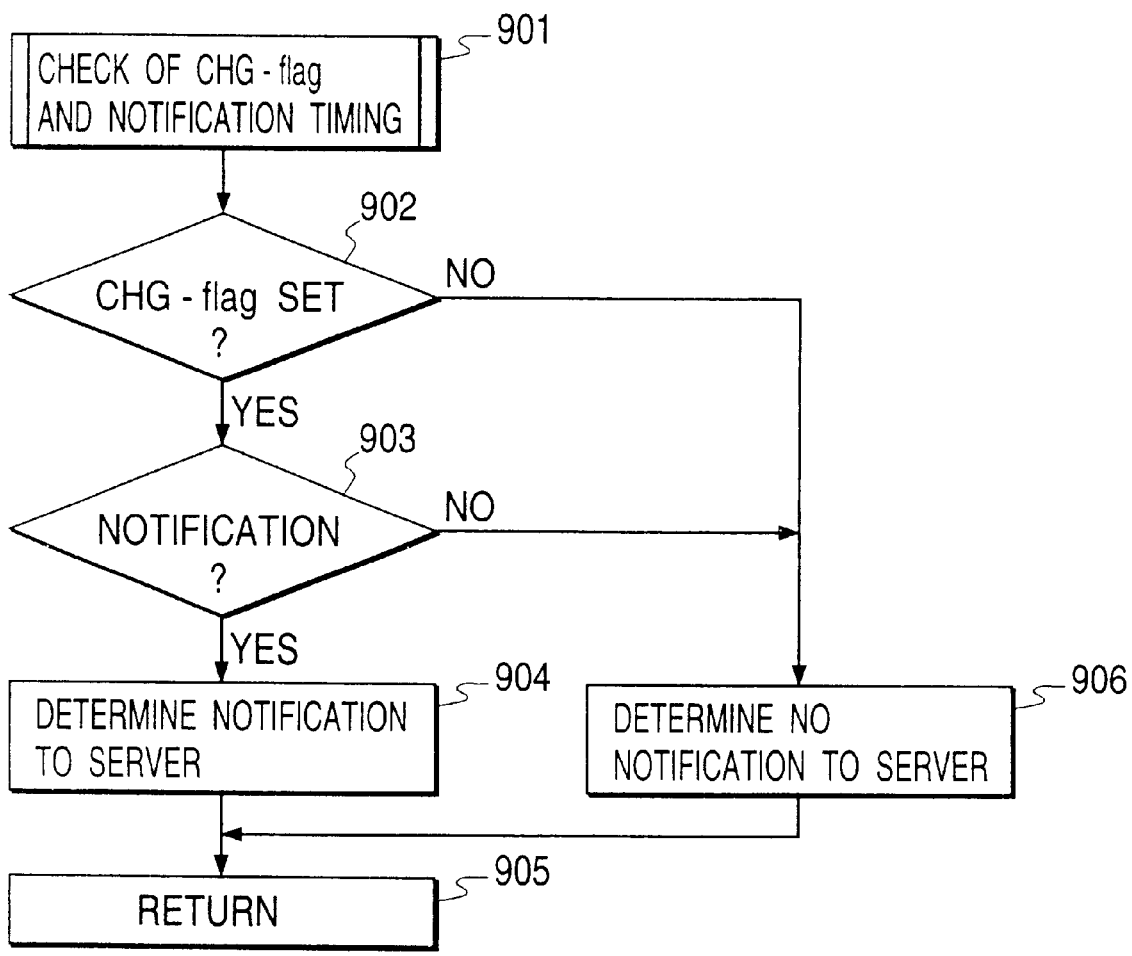
FIG. 10 is a flow chart illustrating a process of judging whether an occurrence of registration change at the facsimile 120 is notified to the facsimile server 118.

FIG. 10 is a flow chart illustrating a judgement operation whether the facsimile 120 notifies the facsimile server 118 of an occurrence of a change in registration data of the facsimile 120.

The judgement operation whether the facsimile 120 notifies the facsimile server 118 of an occurrence of a change in registration data set by the facsimile 120 will be described in detail.

This judgement operation is a routine of judging whether the facsimile 120 itself voluntarily notifies the facsimile server 118 of the change.

First, at step 902, the set/reset state of the "CHG-flag" changed as illustrated in FIG. 9 is checked.

If it is judged at step 902 that the "CHG-flag" is in a set state (there is changed data to be transferred to the facsimile server 118), at step 903 it is determined whether a notification of changed data is issued to the facsimile server 118, in accordance with a priority order of the internal processes of the facsimile 120 (e.g., facsimile communications are executed more preferentially than data transfer) and a notification interval of the facsimile server 118 (the notification interval is set so as not to make the I/F with the facsimile server always busy).

If it is judged at step 903 that a notification is performed, at step 904 it is determined that an occurrence of the change is notified to the facsimile server 118.

If it is judged at step 903 that a notification is not performed, at step 906 it is determined that an occurrence of the change is not notified to the facsimile server 118.

If the "CHG-flag" is in a set state at step 902, it is determined at step 906 that an occurrence of the change is not notified to the facsimile server 118.

Figure 12:
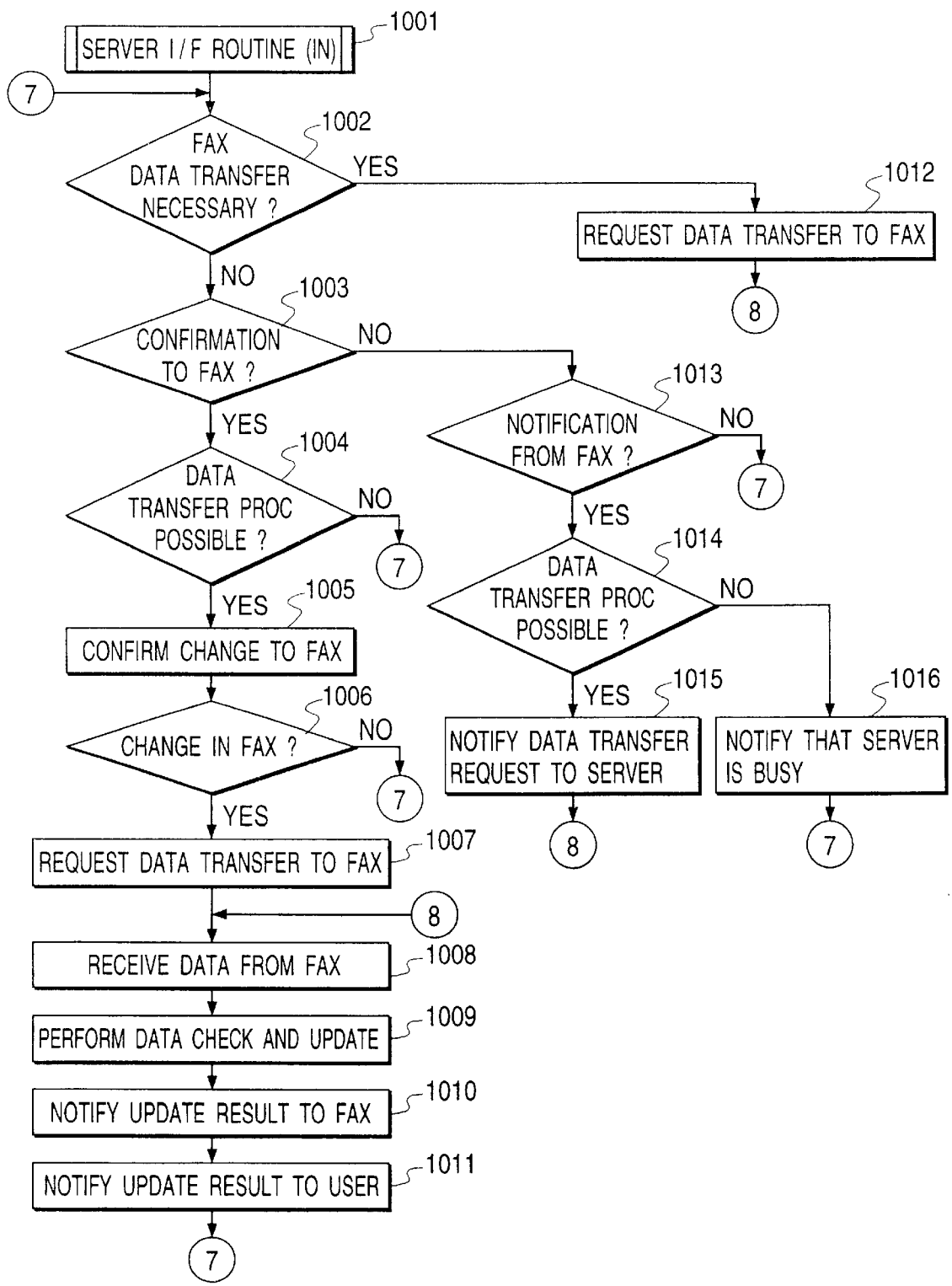
FIG. 12 is a flow chart illustrating a process of transferring data from the facsimile 120 to the facsimile server 118, the process being executed by the facsimile server 118.

FIG. 12 is a flow chart illustrating the operation of the facsimile server 118 when data is transferred from the facsimile 120 to the facsimile server 118.

The details of the process of the facsimile server 118 for receiving data transferred from the facsimile 120 will be given.

At step 1002 it is checked whether the facsimile server 118 requires a transfer of the data of the facsimile 120.

This check whether the facsimile server 118 requires the data is performed irrespective of a change/an unchange of registration data.

The case where data is necessary even in an unchange state is a case when the data of the facsimile server 118 was broken.

If the data of the facsimile 120 is necessary, at step 1012 a data transfer instruction is notified to the facsimile 120 by designating the necessary data.

The data to be transferred may be registration data or report data.

After a transfer request is notified to the facsimile 120 at step 1012, the processes at step 1008 and following steps are executed for the reception of transfer data.

If it is judged at step 1002 that the data of the facsimile 120 is not necessary, at step 1003 the conditions of whether a check of a change is issued to the facsimile 120 are judged.

The timing of issuing a check may be a periodical timing at a preset time interval or a timing before or after a state change when an event such as a facsimile message transfer occurs.

If the data change of the facsimile 120 affects the operation of the facsimile server 118, a check of a change is confirmed.

If it is judged at step 1003 that a check of the change is necessary, at step 1004 it is judged whether the facsimile server 118 can receive transfer data.

If it is judged at step 1004 that the data transfer cannot be received, the flow returns to step 1002 to check again whether data transfer of the facsimile 120 is necessary.

If it is judged at step 1004 that the data transfer can be received, at step 1005 it is checked whether there is changed data in the facsimile 120.

The data change may be checked for all data or only the data to be checked at that timing.

After the check at step 1005, at step 1006 it is checked whether there is a response from the facsimile 120.

If a response of "an unchange" is received from the facsimile 120, i.e., if the facsimile server 118 is not necessary to update data, the flow returns to step 1002 to check whether data transfer is necessary.

If a response of "a change" is received from the facsimile 120, i.e., if the facsimile server 118 is necessary to update data, at step 1007 the facsimile 120 is requested to transfer data.

The requested transfer data may be only the changed data, changed data and its associated data, or all the data of the facsimile 120.

After the data transfer is requested to the facsimile 120 at step 1007, at step 1008 data transfer from the facsimile 120 is received.

After the data transfer from the facsimile 120 is received, at step 1009 the transfer data is checked and the data of the facsimile server 118 is updated, and the updated data is stored in the history file.

After the data check and update, at step 1010 whether the update results are satisfactory is notified to the facsimile 120. After this notification to the facsimile 120, at step 1011 the management program of an event requiring the update results is notified and the update results are displayed on a display of the facsimile server 118 to notify the manager and user of the facsimile server 118.

Thereafter, the flow returns to step 1002 to again check whether the data transfer is necessary.

If it is judged at step 1003 that the facsimile server 118 does not require a check of the data change of the facsimile 120, at step 1013 it is checked whether the facsimile 120 itself voluntarily notifies data change.

If the facsimile 120 is necessary to immediately notify the facsimile server 118 of data change, the facsimile 120 itself voluntarily notifies the facsimile server 118 of data change (the facsimile 120 itself may voluntarily notify always all data changes through software switch settings of the facsimile 120).

If the user switch setting is changed, the data change is immediately notified to the facsimile server 118.

If there is no notification from the facsimile 120 itself, the flow returns to step 1002 to check whether the data transfer is necessary.

If there is a notification from the facsimile 120 itself, at step 1014 it is checked the data transfer can be received by the facsimile server 118.

If it is judged at step 1014 that the data transfer cannot be received, at step 1016 the facsimile server 118 returns a BUSY signal representative of inability of data transfer reception to the facsimile 120 and the flow returns to step 1002 to again check whether the data transfer is necessary.

If it is judged at step 1014 that the data transfer can be received, at step 1015 it is checked whether there is data change in the facsimile 120.

The data to be checked may be all data or the data required to be checked at that timing.

Thereafter, the transfer data reception process at step 1008 and following steps are executed.

FIGS. 13A to 13D are diagrams illustrating data transfer protocols from the facsimile 120 to the facsimile server 118.

The data transfer protocol between the facsimile server 118 (represented by SERVER in the figures) and the facsimile 120 (indicated by Facsimile in the figures) will be described.

FIG. 13A illustrates a data transfer protocol in the normal procedure from the facsimile server 118 to the facsimile 120 (in the normal polling procedure).

At step 1101 a "change check instruction" is sent from the facsimile server 118 to the facsimile 120 to confirm whether a data change (a change necessary for transferring the changed data to the facsimile server 118) has occurred at the facsimile 120.

At this time, the type of data to be checked may be designated by the facsimile server 118.

If there is a data change at the facsimile 120 regarding the "change check instruction" at step 1101, a response "change" is returned at step 1102.

After the facsimile server 118 confirms the "change" at step 1102, it sends a "change data transfer instruction" to the facsimile 120.

At this time, the type of data to be transferred may be designated by the facsimile server 118.

After the facsimile 120 confirms the "change data transfer instruction", it sends the changed data to the facsimile server 118 at step 1104.

At this time, the type of data to be transferred may be designated by the facsimile server 118.

The facsimile 120 may select and process the transmission data.

After the facsimile server 118 confirms the end of data transfer, the internal database is overwritten with the data transferred from the facsimile 120.

After the overwrite of the internal database is normally completed, at step 1105 the facsimile server 118 sends an "update normal end instruction" to the facsimile 120 to notify the data transfer normal end.

Thereafter, the facsimile server 118 sends an "end instruction" of the change data transfer protocol to the facsimile 120 at step 1106.

This instruction may be replaced by the "update normal end instruction" at step 1105.

FIG. 13B illustrates the data transfer protocol when there is no data change at the facsimile 120.

This protocol is used for the case wherein the facsimile server 118 periodically sends the "change check instruction" to the facsimile 120. At step 1107, the facsimile server 118 sends the "change check instruction" to the facsimile 120 to check whether a data change (a change necessary for transferring the registration change data to the facsimile server 118) has occurred at the facsimile 120.

If there is no data change at the facsimile 120 regarding the "change check instruction" at step 1107, a response "unchange" is returned at step 1108.

The next "change check instruction" is sent from the facsimile server 118 at a predetermined time interval so that the I/F unit and facsimile 120 is not in the "BUSY" state at any time.

This timing may not be the predetermined time interval but may be irregular or at a timing before or after an event (execution of facsimile transmission/reception in response to an instruction from the facsimile server 118).

The facsimile server 118 sends in step 1109 again the "change check instruction" to the facsimile 120 to check whether a data change (a change necessary for transferring the registration change data to the facsimile server 118) has occurred at the facsimile 120.

If there is no data change at the facsimile 120 regarding the "change check instruction" at step 1109, a response "unchange" is returned at step 1110.

In the above manner, both the facsimile server 118 and facsimile 120 can share the common data.

FIG. 13C illustrates the data transfer protocol when the facsimile 120 cannot transfer data to the facsimile server 118.

In this protocol, a response "BUSY" is returned if the data transfer process cannot be performed immediately at the facsimile 120, for example, because the instruction is received from the facsimile server 118 during facsimile reception.

At step 1111 the facsimile server 118 sends the "change check instruction" to the facsimile 120 to check whether a data change (a change necessary for transferring the registration change data to the facsimile server 118) has occurred at the facsimile 120.

If the facsimile 120 cannot transfer data in response to the "change check instruction" at step 1111 (because facsimile transmission/reception is under execution or data is being changed), a response "BUSY" is returned at step 1112.

After the facsimile server 118 confirms the response "BUSY" at step 1112, it again sends at step 1113 the "change check instruction" to the facsimile 120 at a predetermined time interval or consecutively.

If the data transfer process cannot be performed still after the "change check instruction" at step 1113, the response "BUSY" is returned at step 1114.

After the facsimile server 118 confirms the response "BUSY" at step 1114, it again sends at step 1115 the "change check instruction" to the facsimile 120 at a predetermined time interval or consecutively.

If the facsimile 120 becomes able to transfer data regarding the "change check instruction" at step 1115 (e.g., after facsimile transmission/reception) and there is a data change at the facsimile 120, a response "change" is returned at step 1116.

Thereafter, the registration change data is transferred in the same manner as illustrated in FIG. 13A.

FIG. 13D illustrates the data transfer protocol wherein the facsimile 120 itself voluntarily transfers data to the facsimile server 118.

With this protocol, a data change at the facsimile 120 is preferentially notified to the facsimile server 118 as soon as possible.

When an important data change occurs at the facsimile 120, the facsimile 120 sends a "data change occurrence" instruction to the facsimile server 118 at step 1117.

Immediately upon reception of the "data change occurrence" instruction, the facsimile server 118 starts the data transfer process.

Steps 1118, 1119, 1120, and 1121 in FIG. 13D are the data transfer process similar to steps 1103, 1104, 1105, and 1106 shown in FIG. 13A.

FIG. 11 is a flow chart illustrating the operation of the facsimile 120 when the facsimile server 118 transfers data to the facsimile 120.

The data transfer process at the facsimile 120 will be detailed.

The data transfer program includes the main routine 720 and the next I/F routine 750 shown in FIG. 7.

In this example, transfer of registration data from the facsimile server 118 to the facsimile 120 will be detailed.

Data such as reception and transmission messages is actually transferred between the facsimile server and facsimile when necessary in practice.

In the I/F routine, at step 751 it is checked whether the facsimile 120 has received a data transfer confirmation instruction (whether data transfer from the facsimile server 118 is possible) such as for setting data change from the facsimile server 118.

After the confirmation instruction from the facsimile server 118 at step 751 is received, it is checked at step 752 whether the facsimile 120 can presently receive the transfer data from the facsimile server 118. This check judges whether the transfer data from the facsimile server 118 cannot be received because the facsimile 120 is in a busy state in facsimile communications or the like or is changing the registration mode.

If it is judged at step 752 that the data transfer is impossible, a response "BUSY" is returned to the facsimile server 118 at step 760 and the flow returns to step 751 to confirm a presence/absence of the transfer confirmation from the facsimile server 118.

If it is judged at step 752 that the data transfer is possible, at step 753 a response that the transfer data can be received is returned to the facsimile server 118.

After a data transfer start instruction from the facsimile server 118 is received at step 754, at step 755 the facsimile 120 receives the data transfer from the facsimile server 118.

If the instruction cannot be received in a preset time interval (time-out) or a transfer interception instruction is received from the facsimile server 118 at step 754, the data transfer is not performed and the flow returns to step 751 to again check a presence/absence of the transfer confirmation from the facsimile server 118.

After the transfer data from the facsimile server 118 is received at step 755, at step 756 the received data is analyzed and stored in RAM 103.

The data reception at step 755 and the data analysis and storage at step 756 may be performed at the same time.

It is checked at step 757 whether the data has been normally received and stored. If it is judged that the data has been updated normally, at step 758 the facsimile server 118 is notified of a normal update end. If it is judged that the data has been unable to be updated normally or the transfer data is abnormal, at step 761 an abnormal update is notified to the facsimile server 118.

At step 759 a notification is given to a user on a display or the like of the console unit 105 of the facsimile 120 and the results are stored in the history file of RAM 103.

If the transfer confirmation from the facsimile server 118 cannot be received at step 751, at step 762 it is checked whether the facsimile 120 requests the facsimile server 118 to transfer data.

The data transfer request is performed, for example, if registration data such as a telephone number at the facsimile 120 becomes abnormal and is required to be registered again, or if registration data is periodically updated.

If the data transfer request for the facsimile server 118 is made at step 763, at step 764 a data transfer request instruction is issued to the facsimile server 118.

After a notification that transfer is possible is received from the facsimile server 118 at step 765, the flow advances to step 754 whereat the transfer data is received from the facsimile server 118.

If the notification is not received in a preset time duration or a notification that transfer is impossible is received from the facsimile server 118 at step 765, the data transfer request is discarded and the flow returns to step 751.

Figure 14:
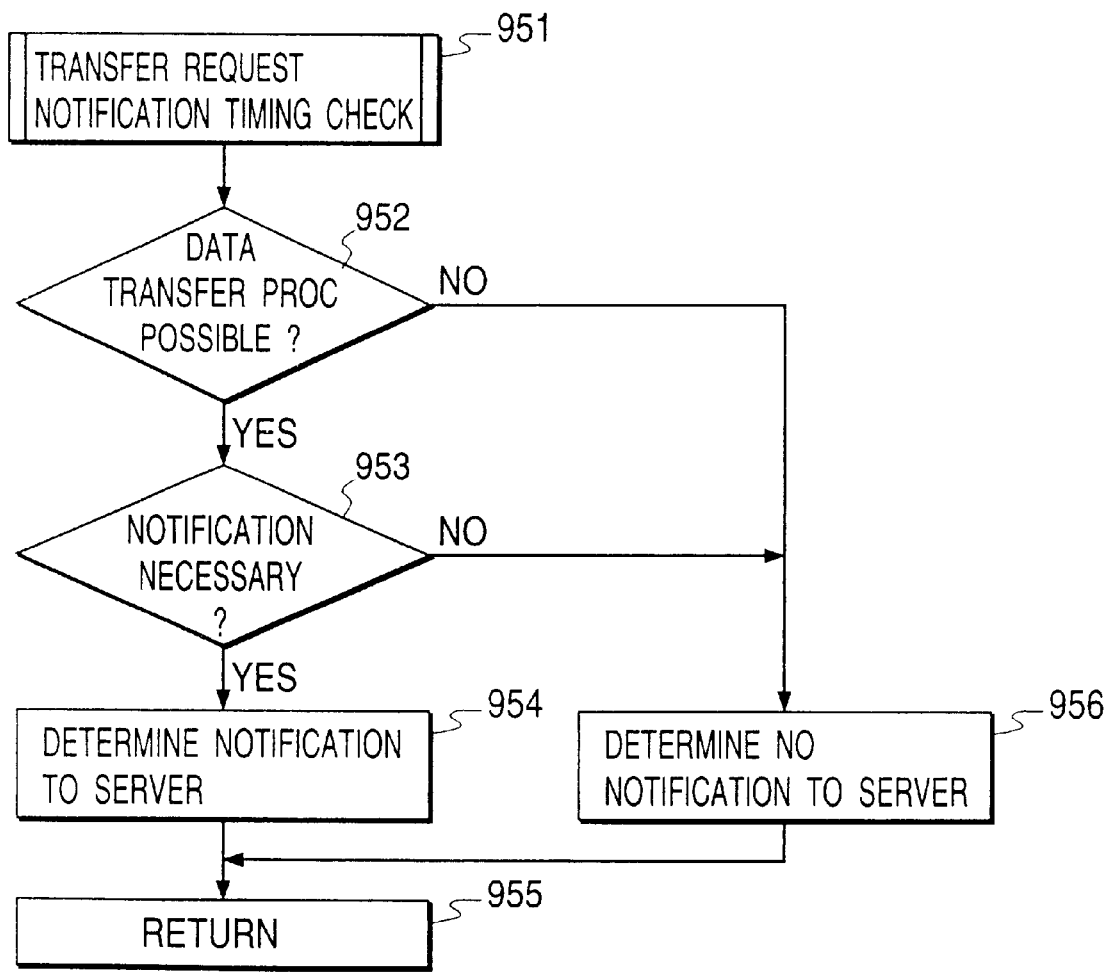
FIG. 14 is a flow chart illustrating a process of judging whether a data transfer request command is notified from the facsimile 120 to the facsimile server 118.

FIG. 14 is a flow chart illustrating the process of determining whether the facsimile 120 notifies a data transfer instruction to the facsimile server 118.

In this routine, the facsimile 120 determines whether the facsimile 120 itself voluntarily notifies a data transfer instruction to the facsimile server 118.

First, at step 952 it is checked whether the facsimile 220 can receive data transfer.

This contents of this check include, for example, a judgement whether the internal processing capacity of the facsimile 120 is sufficient for receiving the data transfer even during parallel print processing, and a judgement whether the timing is suitable if the transfer request is set so that it is periodically notified to the facsimile server 118.

If it is judged at step 952 that the data transfer is possible, it is checked whether it is necessary at the present time for the facsimile 120 itself to voluntarily notify the facsimile server 118 of the data transfer.

This check is performed so as not to reduce a process speed of the facsimile 120 and facsimile server 118 because of unnecessary data transfer requests and to prevent the other processes from being adversely affected.

If it is judged to be necessary, at step 954 the data transfer request to the facsimile server 118 is determined.

If it is judged at step 952 that the facsimile 120 cannot receive data transfer or if it is judged at step 953 that the notification is unnecessary, at step 956 it is judged that the notification is not determined presently.

Figure 15:
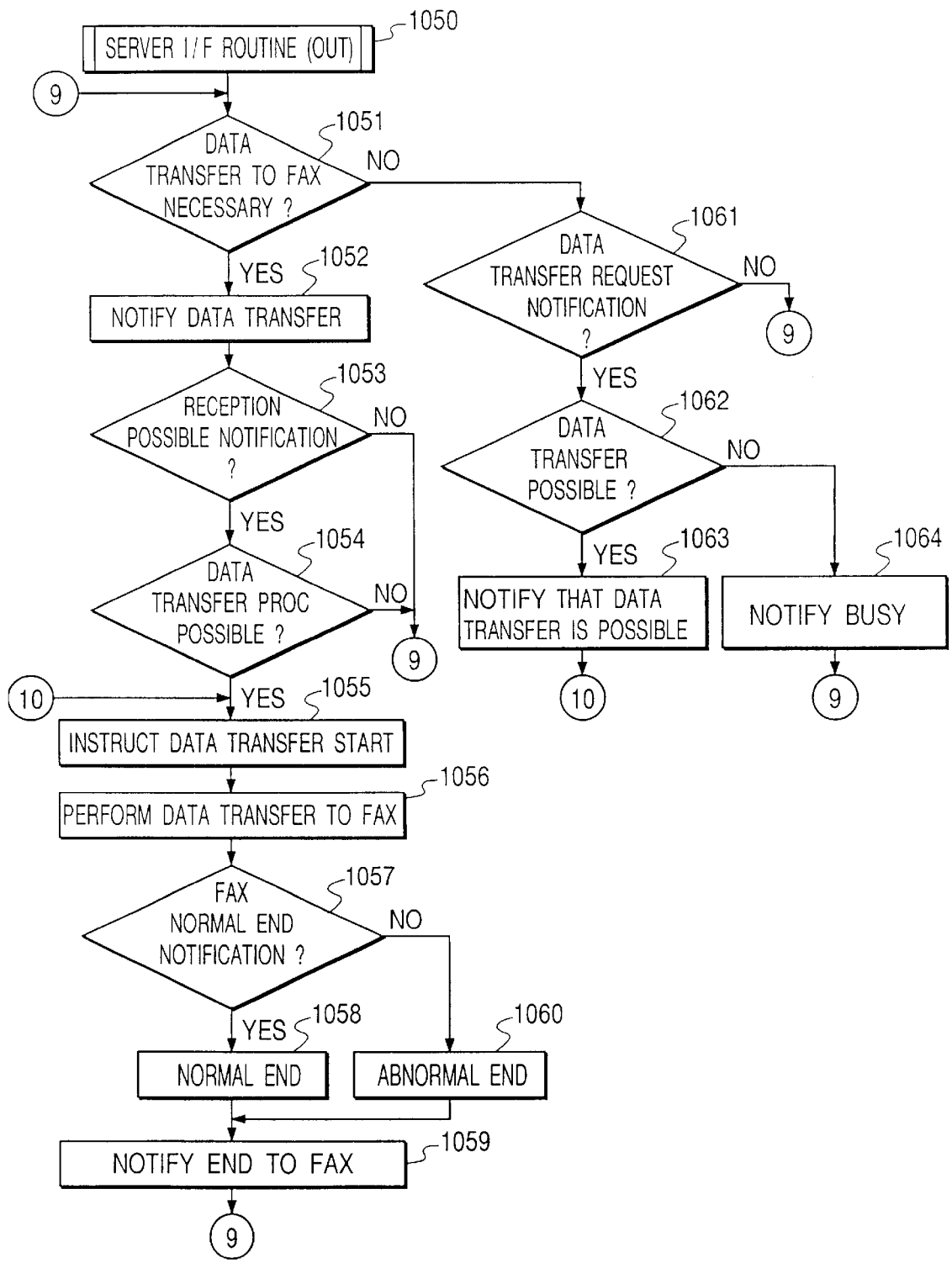
FIG. 15 is a flow chart illustrating a process of transferring data from the facsimile 120 to the facsimile server 118, the process being executed by the facsimile server 118.

FIG. 15 is a flow chart illustrating the operation of the facsimile server 118 when data is transferred from the facsimile server 118 to the facsimile 120.

At step 1051 it is checked whether the facsimile server 118 requires a transfer of data to the facsimile 120.

This check whether the facsimile server 118 requires data transfer is performed irrespective of a change/an unchange of data of the facsimile server 118.

If the data of the facsimile server 118 has been changed, the data is transferred to the facsimile 120 because both the facsimile 120 and facsimile server 118 is required to share the common data.

The case where data transfer is necessary even in an unchange state is a case wherein the facsimile 121 or 122 has transferred data to the facsimile server 118 and the transfer data is required to be transferred to the facsimile 120, a case when data of the facsimile 120 is periodically updated, or other cases.

If it is judged at step 1051 that data transfer to the facsimile 120 is necessary, at step 1052 a data transfer notification is given to the facsimile 120 by designating the necessary data.

After the data transfer is notified to the facsimile 120, at step 1053 it is checked whether a transfer permission has been received from the facsimile 120.

This check is to judge whether the facsimile 120 can receive the data transfer from the facsimile server 118.

The transfer permission information contains a list of data to be transferred from the facsimile 120. The data to be transferred from the facsimile 120 may be all registration data or report data.

After the transfer permission notification is received at step 1053, at step 1054 the data in the facsimile server 118 is checked to confirm that the data transfer is possible.

If the data transfer from the facsimile server 118 is possible, at step 1055 a notification that the data transfer starts is given to the facsimile 120.

At step 1056, the data changed by the facsimile server 118, the data requested from the facsimile 120, or other data are transferred to the facsimile 120.

Next, at step 1057 a notification that the data transfer and update have been normally completed is received from the facsimile 120.

Upon reception of this normal end notification, the facsimile server 118 judges at step 1058 that the data transfer has been normally completed.

If a notification of an abnormal end is received from the facsimile 120 or the notification is not received in a preset time duration from the facsimile 120, it is judged at step 1060 that the data transfer has been abnormally completed.

At step 1059 a user is notified of the data transfer results through displaying and the facsimile 120 is notified of the process end.

If the data change at the facsimile 120 is notified to the other facsimiles 121 and 122, the notification results are returned to the facsimile 120.

Thereafter, the flow returns to step 1051 to judge whether the next data transfer is necessary.

If it is judged at step 1051 that the notification of the data transfer from the facsimile server 118 to the facsimile 120 is unnecessary, at step 1061 it is checked whether there is a data transfer request from the facsimile 120.

If there is no data transfer request, the flow returns to step 1051 to judge whether the next data transfer is necessary.

If the data transfer request from the facsimile 120 is received, at step 1062 it is checked whether the facsimile server 118 can execute the data transfer process.

The conditions that the facsimile server 118 can execute the data transfer process are that data change of the facsimile server 118 has been completed, the internal processing capacity is sufficient for data transfer, and the facsimile 120 requested data transfer has been registered in the facsimile server 118.

If it is judged that the data transfer is executed, at step 1063 the facsimile 120 is notified that the data transfer is possible and at step 1055 the data transfer starts.

If it is judged that the data transfer is not executed, at step 1064 a response "BUSY" is returned and the flow returns to step 1051 to judge whether the next data transfer is necessary.

The instruction of the data transfer interception supplied to the facsimile 120 at step 1064 may be other instructions depending upon the interception conditions.

FIGS. 16A to 16D are diagrams illustrating data transfer protocols from the facsimile server 118 to the facsimile 120.

The data transfer protocol between the facsimile server 118 (represented by SERVER in the figures) and the facsimile 120 (indicated by Facsimile in the figures) will be described.

FIG. 16A illustrates a data transfer protocol in the normal procedure from the facsimile server 118 to the facsimile 120 in the normal polling procedure.

At step 1150 a "data transfer instruction" is sent from the facsimile server 118 to the facsimile 120 to confirm whether data transfer is possible from the facsimile server 118 to the facsimile 120.

At this time, the type of data to be transferred may be designated by the facsimile server 118.

If the facsimile 120 can receive the data transfer relative to the "data transfer instruction" at step 1150, a response "transfer permission instruction" is returned at step 1151.

At this time, the type of data to be transferred may be designated by the facsimile 120.

After the facsimile server 118 confirms the "transfer permission instruction" at step 1151, it sends a "data transfer start instruction" to the facsimile 120 at step 1152.

After the facsimile server 118 notifies the "data transfer start instruction", at step 1153 it transfers the registration change data to the facsimile 120.

At this time, the type of data to be transferred may be designated by the facsimile server 118.

After the facsimile 120 confirms the end of data transfer, the internal database (contents of mail boxes and the like) is overwritten with the data transferred from the facsimile server 118.

After the overwrite of the internal database is normally completed, the facsimile 120 sends an "update normal end instruction" to the facsimile server 118 to notify the data transfer normal end.

Thereafter, the facsimile server 118 sends an "end instruction" of the change data transfer protocol to the facsimile 120 at step 1155.

FIG. 16B illustrates the data transfer protocol when the facsimile 120 cannot receive a data change.

In this protocol, the data transfer instruction is periodically sent from the facsimile server 118 to the facsimile 120.

At step 1162 the facsimile server 118 sends the "data transfer instruction" to the facsimile 120 to check whether data transfer from the facsimile server 118 to the facsimile 120 is possible.

If the facsimile 120 cannot receive the registration change data relative to the "data transfer instruction" at step 1162, a response "BUSY" is returned at step 1163.

The "BUSY" response is used when data transfer cannot be received because the facsimile 120 is performing facsimile transmission/reception or other tasks. If the data transfer cannot be received because of other conditions, a different response may be returned.

The next "data transfer instruction" is sent from the facsimile server 118 at a predetermined time interval so that the I/F unit and facsimile 120 is not in the "BUSY" state at any time.

This timing may not be the predetermined time interval but may be irregular or at a timing before or after an event (execution of facsimile transmission/reception in response to an instruction from the facsimile server 118).

The facsimile server 118 sends again the "data transfer instruction" to the facsimile 120 to check whether data transfer from the facsimile server 118 to the facsimile 120 is possible.

If the facsimile 120 cannot receive the registration change data in response to the "data transfer instruction" at step 1164, the response "BUSY" is returned at step 1165.

Thereafter, the facsimile server 118 sends again the "data transfer instruction" to the facsimile 120 at step 1166 to check whether data transfer from the facsimile server 118 to the facsimile 120 is possible.

If the facsimile 120 can receive the registration change data in response to the "data transfer instruction" at step 1166, the response "transfer permission instruction" is returned at step 1167 to perform the data transfer in the manner like that illustrated in FIG. 16A.

Figure 16D:
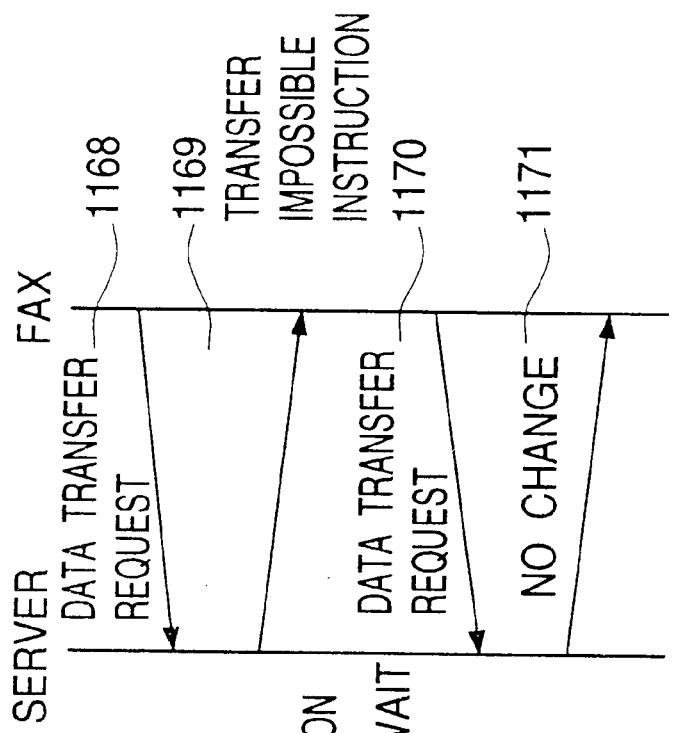
Figure 16C:
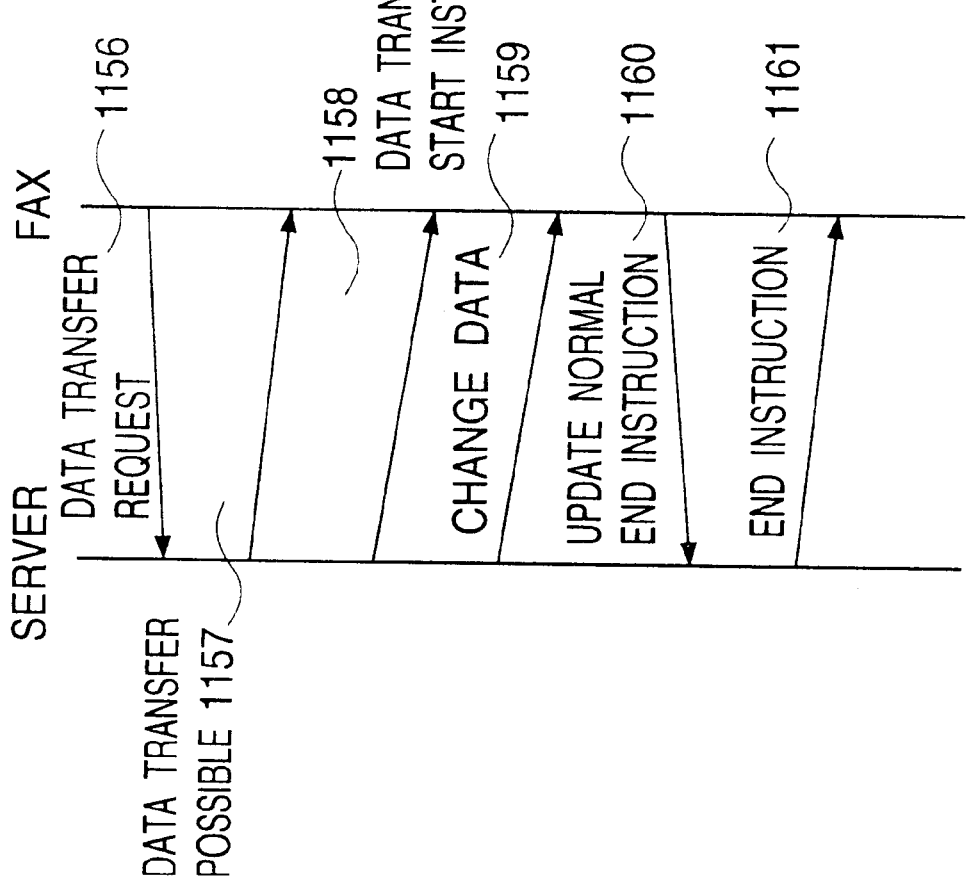

FIG. 16C illustrates a data transfer protocol wherein the facsimile 120 requests the facsimile server 118 to transfer data.

This protocol is performed, for example, registration data of the facsimile 120 becomes abnormal and it is required to be registered again.

At step 1156 the facsimile 120 sends a "transfer request instruction" to the facsimile server 118.

At this time, the type of data to be transferred may be designated by the facsimile 120.

If the facsimile server 118 received the "data transfer request instruction" can transfer data, at step 1157 it returns a "data transfer possible instruction" to the facsimile 120 to start the data transfer process.

With the data transfer process, first a "data transfer start instruction" is notified to the facsimile 120 at step 1158 and then the registration change data is transferred at step 1159.

At this time, the type of data to be transferred may be designated by the facsimile server 118.

After the facsimile 120 confirms the end of data transfer, the internal database (contents of mail boxes and the like) is overwritten with the data transferred from the facsimile server 118.

After the overwrite of the internal database is normally completed, at step 1160 the facsimile 120 sends an "update normal end instruction" to the facsimile server 118 to notify the data transfer normal end.

Thereafter, the facsimile server 118 sends an "end instruction" of the change data transfer protocol to the facsimile 120 at step 1161.

FIG. 16D illustrates the data transfer protocol wherein although the facsimile 120 requests the facsimile server 118 to transfer data, the facsimile server 118 cannot transfer data.

This data transfer protocol is used, for example, if the facsimile server 118 is executing another task when the data transfer is requested by the facsimile 120 and cannot transfer data.

First, at step 1168, the facsimile 120 sends a "data transfer request instruction" to the facsimile server 118.

If the facsimile server 118 received the "data transfer request instruction" cannot transfer data, at step 1169 it returns a response "data transfer impossible instruction" to the facsimile 120.

The next "data transfer request instruction" is sent from the facsimile 120 at a predetermined time interval so that the I/F unit and facsimile 120 is not in the "BUSY" state at any time.

This timing may not be the predetermined time interval but may be irregular or at a timing before or after an event (execution of facsimile transmission/reception in response to an instruction from the facsimile server 118).

At step 1170, the facsimile 120 sends again the "data transfer request instruction" to the facsimile server 118.

If the facsimile server 118 received the "data transfer request instruction" judged that there is no registration change data if the data transfer request is limited only to the registration change data, at step 1171 it returns a "no change data" to the facsimile 120.

Figure 17:
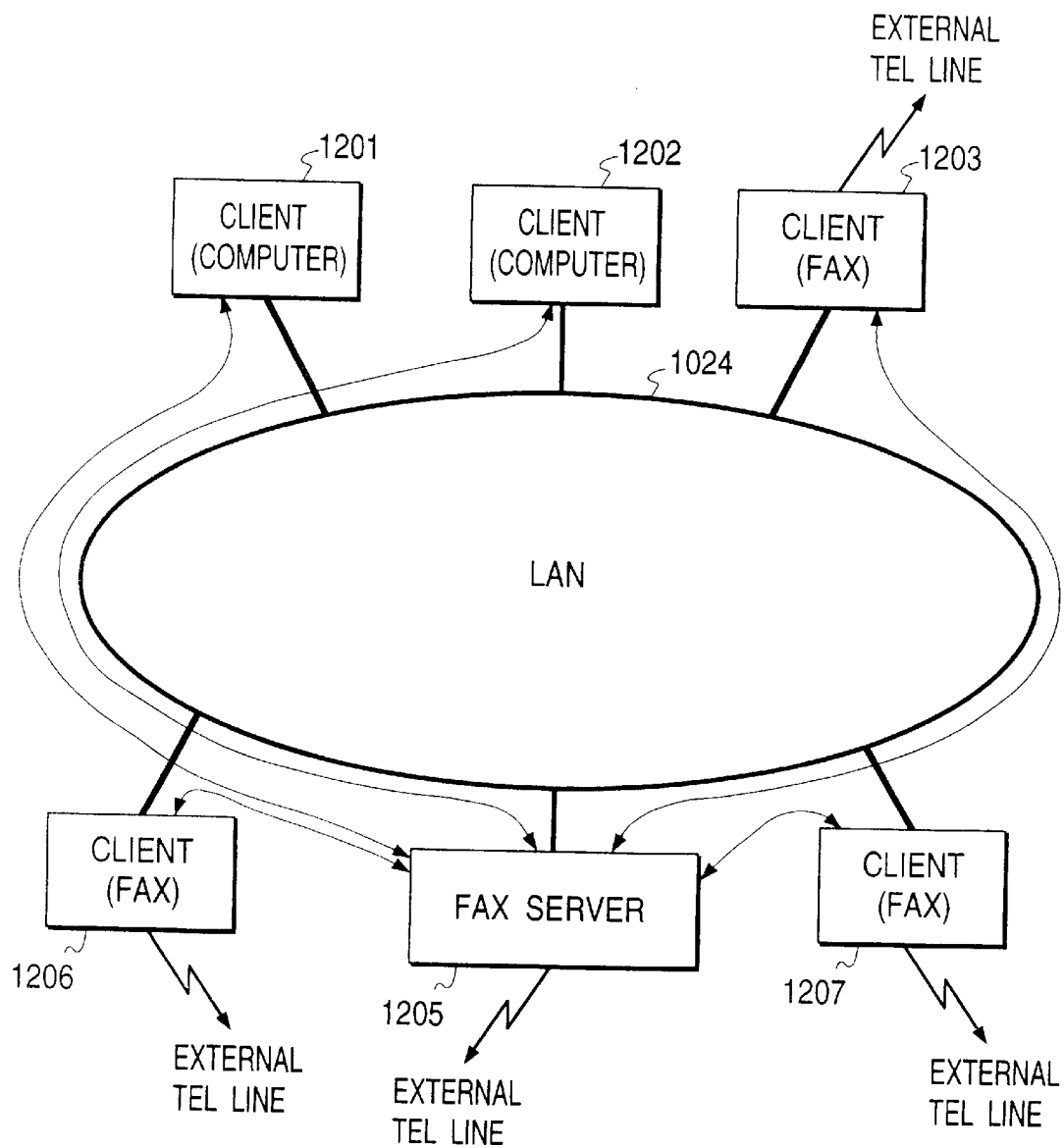
FIG. 17 illustrates a flow of data when a facsimile is directly connected to a LAN.

FIG. 17 is a diagram illustrating the data flow with facsimiles directly connected to a LAN.

A facsimile 1203 is directly connected to a LAN 1204 as a client of LAN.

Connected to LAN 1204 are other clients including computers 1201 and 1202 and a computer 1205 as a facsimile server.

Connected to LAN 1204 are facsimiles 1206 and 1207 as LAN clients.

The facsimile server 1205 has a modem for facsimile communications via an external telephone line.

The computers 1201 and 1202 request the facsimile server 1205 to perform facsimile transmission, and also request the facsimile server 1205, and facsimiles 1203, 1206, and 1207 to transfer messages stored therein.

The facsimile 1203 transmits a message (image) read from an original directly via an external telephone line or requests the facsimile server 1205 to transmit the message like the computers 1201 and 1205.

The facsimile 1203 requests via LAN 1204 the facsimile server 1205 to transfer reception data at the facsimile server 1205 and print it.

The facsimile 1203 and facsimile server 1205 share the common data on LAN 1204 to provide efficient transmission and message storage.

Specifically, execution of communications is distributed among the facsimile server 1205 and facsimiles 1203, 1206, and 1207, messages to the same destination are collectively managed, management of reception messages is passed to the facsimile server 1205, and messages received at the facsimile 1203 are transferred to the facsimile server 1205 for generation of a database.

Necessary registration data is shared among the facsimile server 1205, facsimiles 1203, 1206, 1207, and computers 1201 and 1202 on LAN 1204.

The facsimiles 1206 and 1207 may have the same function as the facsimile 1203, or the function (e.g., broadcast function) of one facsimile may be shared by other facsimiles.

Next, the processes of notifying or not notifying the facsimile server of a registration data change at the facsimile will be described.

The case where the registration data change is notified to the facsimile server may be a case wherein dial numbers of users and companies registered in a dial list are changed because of transfer of users and companies, this change is notified to the facsimile server 118, all dial numbers of the same users and companies registered in the facsimile server 118 are changed to make the facsimile 120 and facsimile server 118 to share the common data.

The case where the registration data change is not notified to the facsimile server may be a case wherein a threshold value of a pickup sensor is changed at the facsimile 120.

Figure 18:
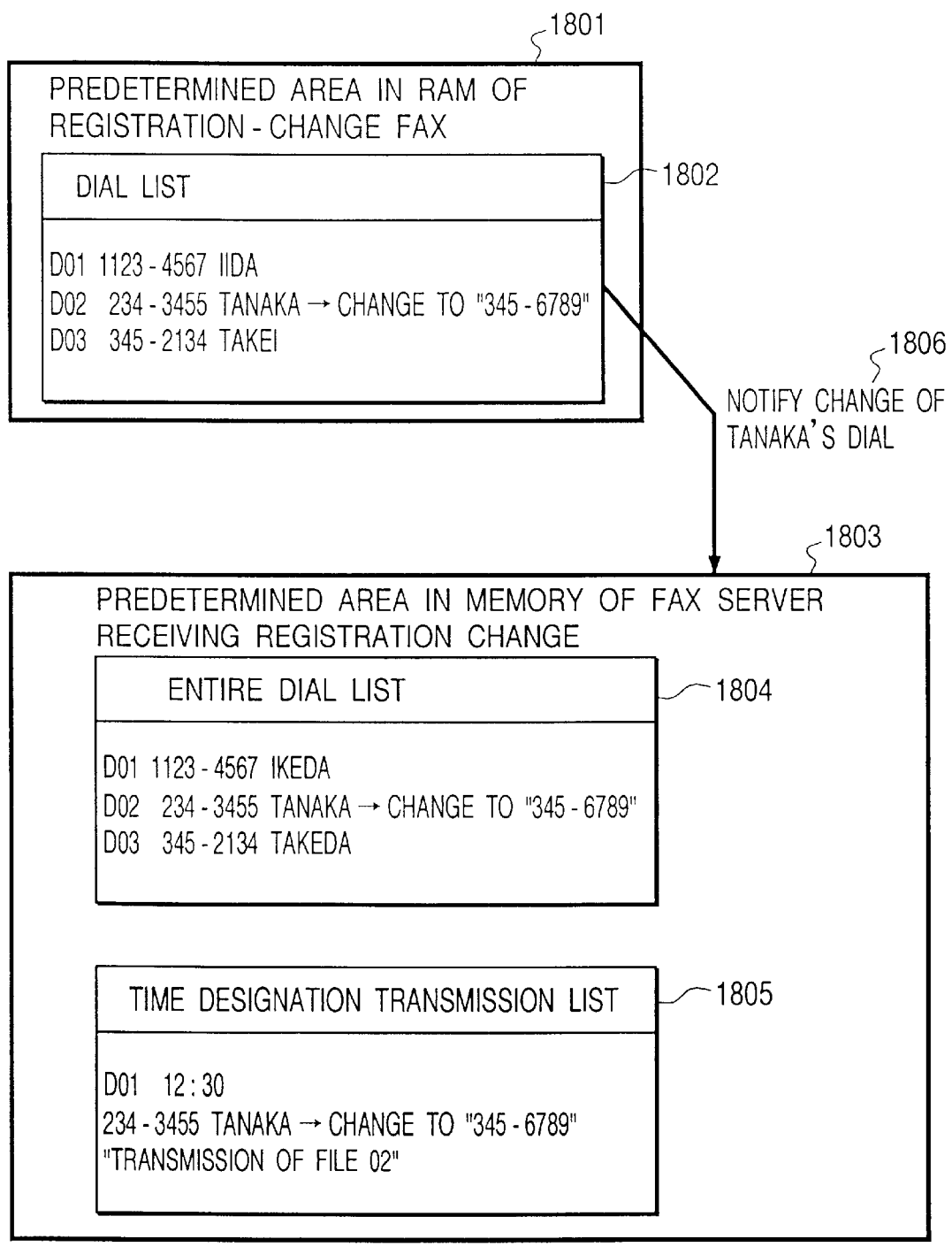
FIG. 18 illustrates a flow of data when a dial number changed at a facsimile is transmitted to the facsimile server 118.

FIG. 18 illustrates the data flow wherein a dial number "234-3455" registered in the facsimile 120 as "TANAKA" is changed to "345-6789".

A user changes the dial number "234-3455" of a name TANAKA in a dial list 1802 stored in a predetermined area 1801 of RAM 103 of the facsimile 120, to "345-6789", and at the same time CPU 101 of the facsimile 120 issues a change notification 1806 of the dial number of TANAKA to the facsimile server 118 in the dial number change process.

The change notification 1806 of the dial number of TANAKA is sent via the I/F control unit 115.

Upon reception of the change notification 1806 of the dial number of TANAKA, the facsimile server 118 detects a dial list in which the dial number is registered with the name of TANAKA.

In the example shown in FIG. 18, TANAKA is registered at D02 of an entire dial list 1804 and at D01 in a time designation transmission list 1805.

The facsimile server 118 detects the entire dial list 1804 and time designation transmission list 1805 on which TANAKA is registered, and changes the dial number of TANAKA at D02 in the entire dial list 1804 and at D01 in the time designation transmission list 1805, to "345-6789".

Figure 19:
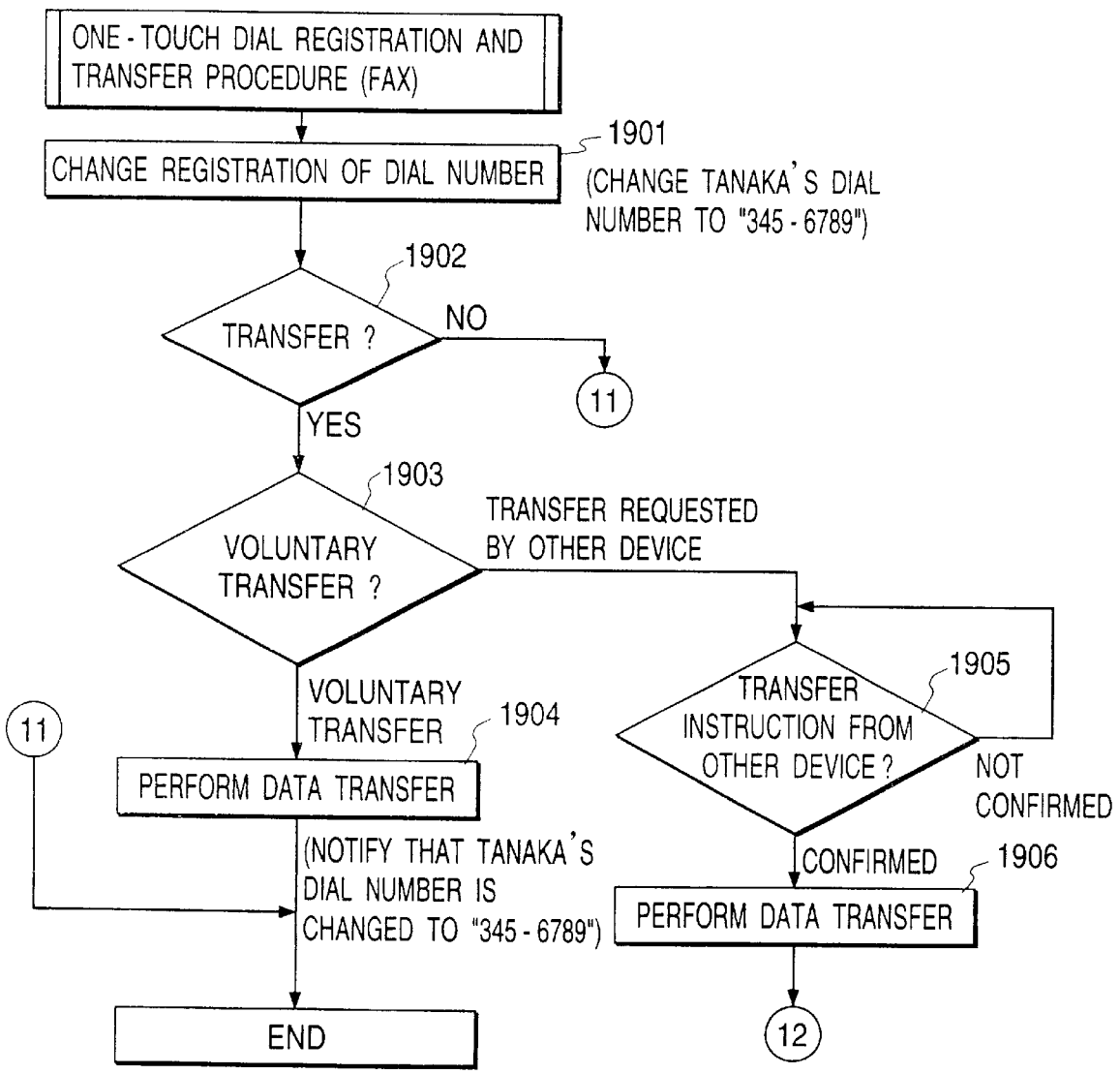
FIG. 19 is a flow chart illustrating a process of notifying a change in a dial number of a facsimile from the facsimile to the facsimile server 118, the process being executed by the facsimile.

FIG. 19 is a flow chart illustrating a process to be executed by the facsimile 120 up to an issuance of a dial number change notification to the facsimile server 118.

At step 1901 a user changes the dial number registered in the name of TANAKA to "345-6789" by using the console unit 105.

It is checked at step 1902 whether the changed contents are required to be transferred to the facsimile server 118. If not necessary (e.g., in the case of dial information specific to the facsimile 120), the process terminates.

If it is judged to be necessary (e.g., in the case of transferring the change to the facsimile server 120, facsimile 121 or 122), at step 1903 it is checked whether the facsimile 120 itself voluntarily transfers the change contents or transfers upon request.

If it is judged at step 1903 that the facsimile 120 itself voluntarily transfers the change contents, at step 1904 a change notification (with changed data) of the dial number of TANAKA is transferred to the facsimile server 118.

If it is judged at step 1903 that the facsimile 120 transfers the change contents upon request from the facsimile server 118, at step 1905 a request from the facsimile server 118 is awaited.

After the request from the facsimile server 118 is confirmed, at step 1906 a change notification (with changed data) of the dial number of TANAKA is transferred to the facsimile server 118.

The transfer and data format of the change notification at steps 1904 and 1906 may be different from the above so long as the destination side can correctly analyze the change notification.

In the registration change process described above, the dial number registered in the name of a user is changed. The notification contents and means may be different from the above, such as a name change and a registration number change, so long as the destination side can correctly know the change contents and change the registration contents in accordance with the change notification.

Figure 20:
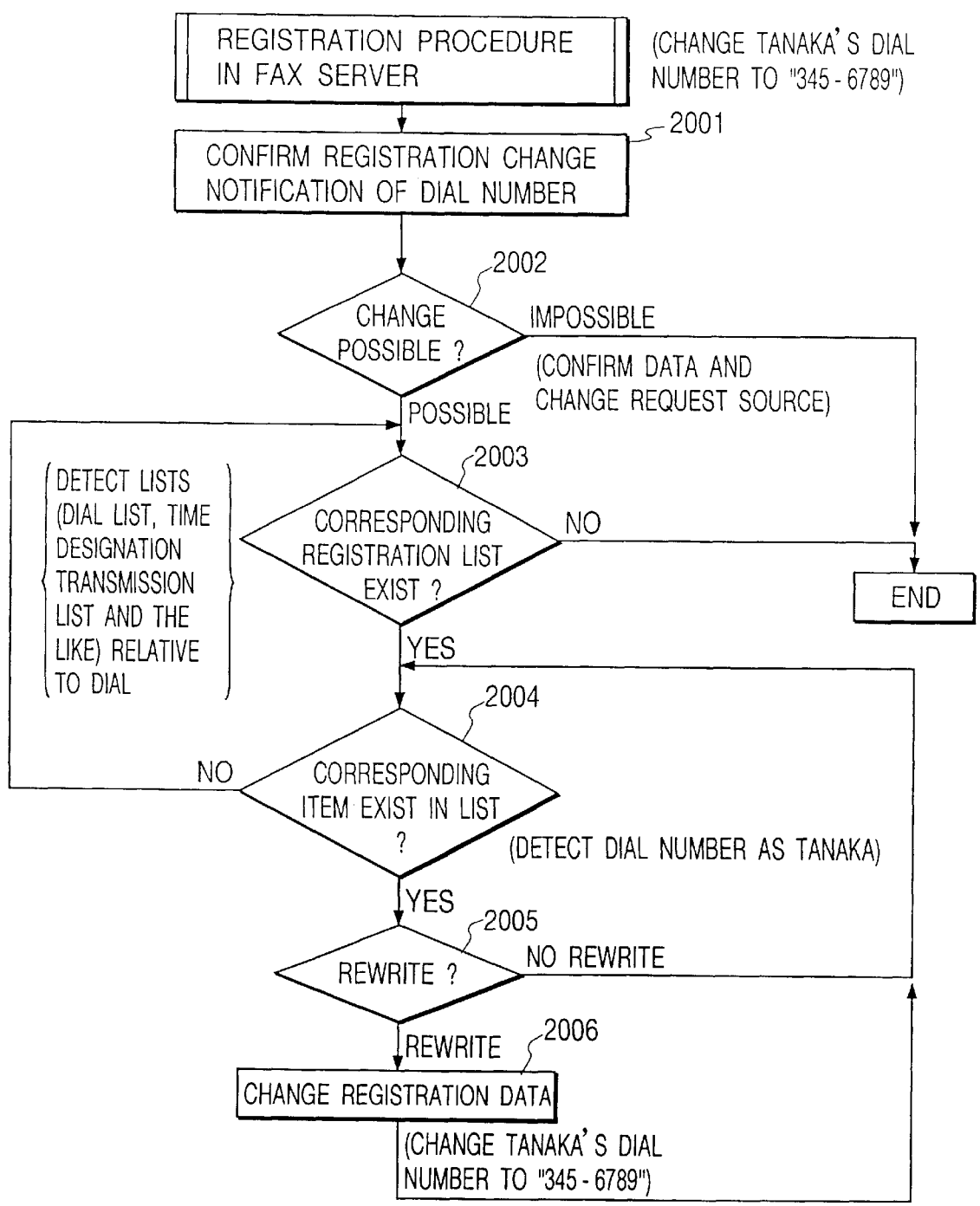
FIG. 20 is a flow chart illustrating a process of changing registration data after a change in registration data is notified by a facsimile which changed the dial number, the process being executed by the facsimile server 118.

FIG. 20 is a flow chart illustrating a process to be executed by the facsimile server 118 wherein the facsimile server 118 receives a change notification of the dial number from the facsimile 120 and changes the registration contents.

At step 2001, the facsimile server 118 checks the dial registration contents referring to the change notification from the facsimile 120.

In this case, the change notification may be either a notification which the facsimile 120 voluntarily transferred or a notification which was transferred upon request from the facsimile server 118.

After the change notification is confirmed, at step 2002 it is checked whether the registration data in the facsimile server 118 is to be changed.

The changed contents and changed user are identified from the change notification, and if there is no problem even if the registration contents of the facsimile server 118 are changed, then the change process is conducted.

If a change in the registration contents is not proper such as if the changed user is a person not permitted to access the facsimile server 118, the registration contents are not changed and the change process terminates. A message to this effect is output.

If the registration contents are changed, at step 2003 it is checked whether the facsimile server 118 has a registration list containing the data corresponding to the change contents.

Specifically, if the registration change contents are a dial number "345-6789" registered in the name of TANAKA, it is checked whether this dial number is present.

If there is no list containing the corresponding data, the registration change is terminated.

If the list containing the corresponding data is detected, at step 2004 it is checked whether the list contains the dial number registered in the name of TANAKA.

If there is the dial number, at step 2005 it is checked whether the dial number can be changed. If possible, at step 2006 the dial number corresponding to the name of TANAKA is changed to "345-6789", and the next registration contents are referred to at step 2004 to continue the registration change.

If the registration change is not possible, the next registration name is referred to continue the registration change.

If all the registration names in the list are checked, the next registration list is checked at step 2003.

If all the corresponding lists are checked, the registration content change is terminated.

If the list is searched by a name, a plurality of candidates whose registration contents are changed may appear. A plurality of search items may therefore be used if necessary.

Also if necessary, a plurality of dial numbers having the same name may be changed.

Figure 21:
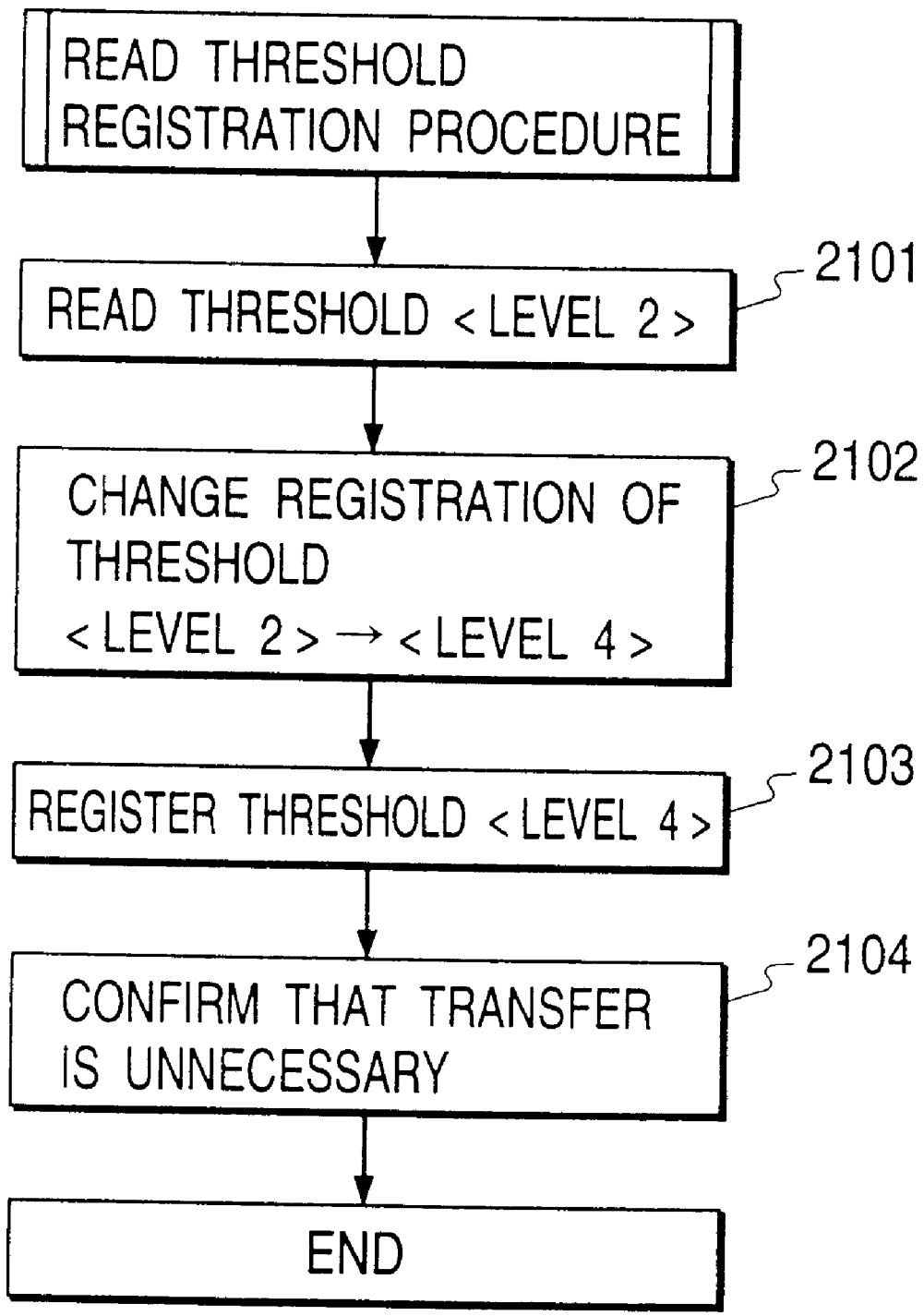
FIG. 21 is a flow chart illustrating a process to be executed by a specific facsimile when data to be registered in this specific facsimile is changed.

FIG. 21 is a flow chart illustrating a process to be executed by the facsimile 120 wherein a threshold value of a pickup sensor for reading an original image is changed and registered, the threshold value being specific to each facsimile.

The threshold value of a pickup sensor is used for A/D conversion of data read with the pickup sensor, and depends on the mechanical and electrical characteristics of each facsimile so that it is required to be set for each facsimile, the threshold value being changed in the registration function mode.

The process of changing the threshold level, for example, from level 2 to level 4, will be described.

At step 2101, the level 2 of the threshold value is read from RAM 103 of the facsimile 120.

At step 2102, the threshold value is changed from level 2 to level 4.

At step 2103, the changed level 4 is registered in RAM 103 of the facsimile 120.

At step 2104, it is confirmed that the changed data is specific to the facsimile 120 and is not necessary to be transferred to the facsimile server 118, and thereafter, the threshold registration process is terminated.

Next, the processes of notifying or not notifying a registration data change at the facsimile server to another terminal connected via LAN to the facsimile server will be described.

In the following description, a facsimile is used as a destination side by way of example. A destination to which a data change is notified is not limited to the facsimile.

The case where the registration data change is notified to the facsimile may be a case wherein dial numbers of users and companies registered in the dial list are changed because of transfer of users and companies, this change is notified to the facsimiles 120, 121, 122 (in the following description, only the facsimile 120) if necessary, all dial numbers of the same users and companies registered in the facsimiles 120, 121, and 122 are changed to make the facsimile 120 and facsimile server 118 to share the common data.

The case where the registration data change is not notified to the facsimile may be a case wherein initials of a communication management report for the whole system is changed at the facsimile server 118.

Figure 22:
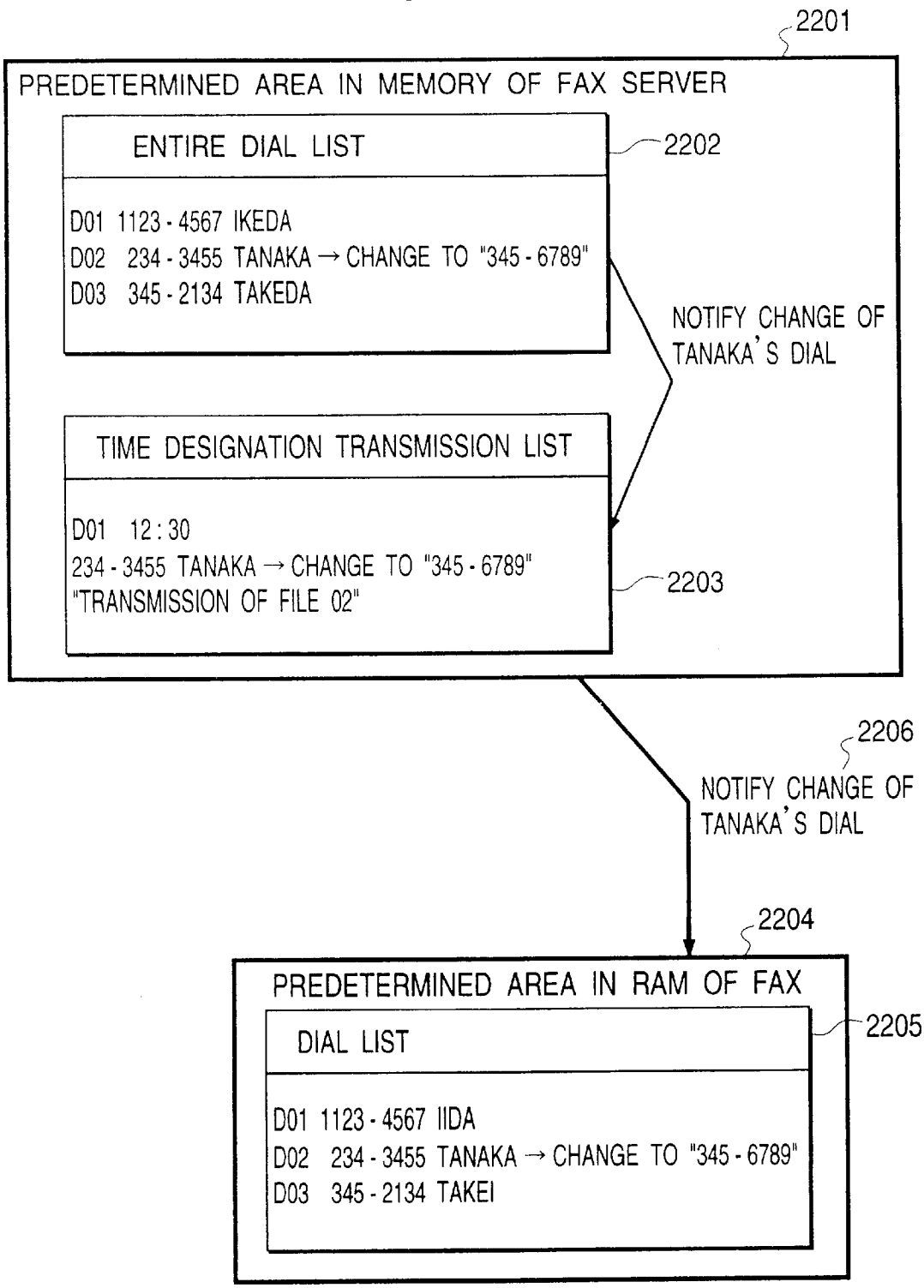
FIG. 22 is a diagram illustrating the flow of data when a dial number changed by the facsimile server 118 is transmitted to the corresponding facsimile.

FIG. 22 illustrates the data flow wherein a dial number "234-3455" registered in the facsimile server 118 as "TANAKA" is changed to "345-6789".

A user changes the dial number "234-3455" of a name TANAKA in an entire dial list 2202 stored in a storage area 2201 of the facsimile server 118, to "345-6789".

In the example shown in FIG. 22, TANAKA is registered at D02 of the entire dial list 2202 and at D01 in a time designation transmission list 2203.

The facsimile server 118 detects the entire dial list 2202 and time designation transmission list 2203 on which TANAKA is registered, and changes the dial number of TANAKA at D02 in the entire dial list 2202 and at D01 in the time designation transmission list 2203, to "345-6789".

The facsimile server 118 notifies the facsimile of a change notification 2206 of the dial number of TANAKA in the dial number change process.

The change notification 2206 of the dial number of TANAKA is notifies via the I/F control unit 115 of the facsimile.

Upon reception of the change notification 2206 of the dial number of TANAKA, the facsimile detects the data list in which the dial number is registered in the name of TANAKA.

The facsimile changes the dial number "234-3455" of TANAKA stored in the dial list 2205 of RAM 103 to "345-6789".

Figure 23:
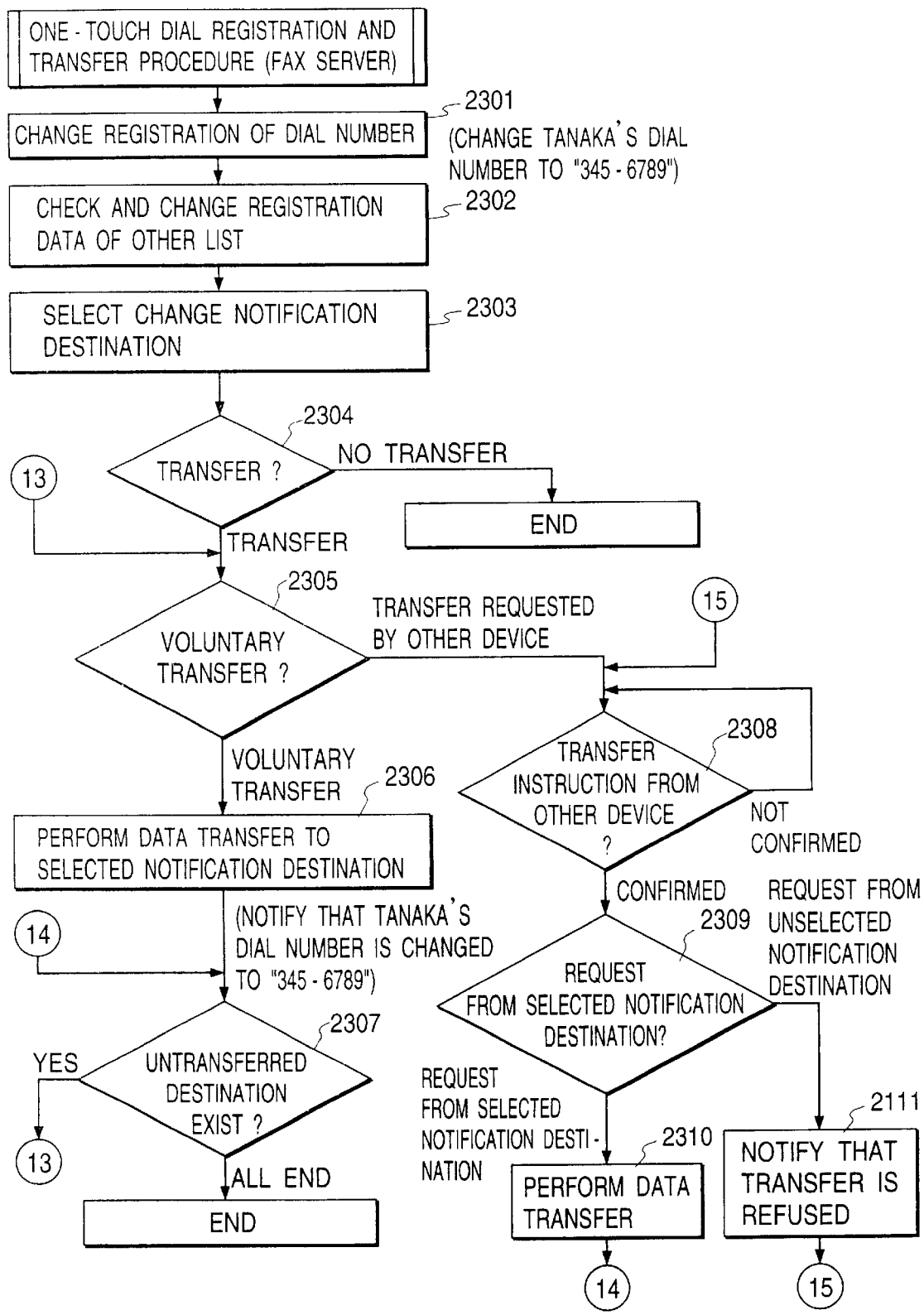
FIG. 23 is a flow chart illustrating a process of notifying a change in the dial number at the facsimile server 118 to the corresponding facsimile, the process being executed by the facsimile server 118.

FIG. 23 is a flow chart illustrating a process to be executed by the facsimile server 118 up to an issuance of a dial number change notification to the facsimiles 120, 121, and 122.

At step 2301 a user changes the dial number registered in the name of TANAKA to "345-6789".

It is checked at step 2302 whether the registration data change, i.e., a dial number change affects another list in the facsimile server 118. If it affects, the contents of the list are automatically changed so as to reflect the change contents of registration data.

At step 2303 a destination to which the change contents are notified is selected if necessary from the facsimiles 120, 121, and 122 connected to the facsimile server 118.

At step 2304 it is checked whether the destination to which the change contents are notified was selected.

If not selected, the registration change process is terminated.

If selected, a notification process is executed to sequentially notify the change contents to the selected destinations.

At step 2305 it is checked whether the server 118 itself voluntarily transfers the change contents or transfers upon request.

If it is judged at step 2305 that the facsimile server 118 itself voluntarily transfers the change contents, at step 2306 a change notification (with changed data) of the dial number of TANAKA is transferred to the facsimile selected facsimile (e.g., facsimile 120).

If it is judged at step 2307 that there is still another transfer destination (e.g., facsimile 121 or 122), the flow returns to step 2305 to check the transfer conditions and continue the data transfer.

If there is no transfer destination, the transfer process is terminated.

If it is judged at step 2305 that the facsimile server 118 transfers the change contents upon request from a facsimile, at step 2308 a request from the facsimile is awaited.

After the request from the facsimile 120 is confirmed, at step 2303 it is checked whether the facsimile 120 is the destination selected (permitted) at step 2303. If not selected, at step 2311 the requested side is notified of that the registration change data cannot be transferred and a request is again awaited at step 2308.

If it is judged at step 2309 that the registration change data can be transferred, the change notification (with changed data) of the dial number of TANAKA is transferred to the facsimile 120.

After the change notice is transferred, at step 2307 it is checked whether the transfer process is to be continued.

The transfer and data format of the change notification at steps 2306 and 2309 may be different from the above so long as the destination side can correctly analyze the change notification.

In the registration change process described above, the dial number registered in the name of a user is changed. The notification contents and means may be different from the above, such as a name change and a registration number change, so long as the destination side can correctly know the change contents and change the registration contents in accordance with the change notification.

Figure 24:
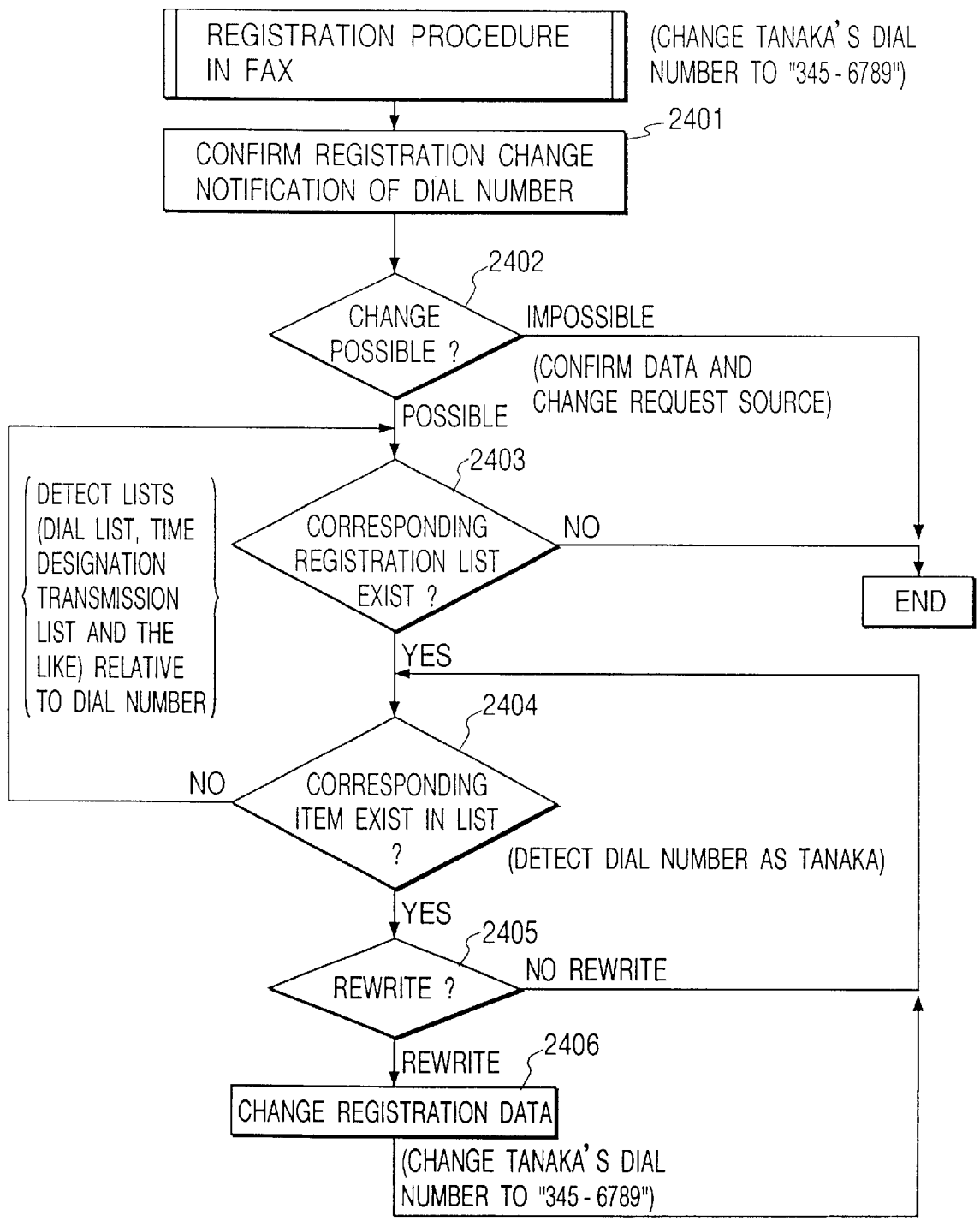
FIG. 24 is a flow chart illustrating a process of changing registration data after a change in registration data is notified by the facsimile server 118 which changed the dial number, the process being executed by the corresponding server 120.

FIG. 24 is a flow chart illustrating a process to be executed by the facsimile 120 wherein the facsimile 120 receives a change notification of the dial number from the facsimile server 118 and changes the registration contents.

The following registration content change process is also applied to the facsimiles 121 and 122 which performs this process in accordance with the received change notification.

At step 2401, the facsimile 120 checks the dial registration contents referring to the change notification from the facsimile server 118.

In this case, the change notification may be either a notification which the facsimile server 118 voluntarily transferred or a notification which was transferred upon request from the facsimile 120.

After the change notification is confirmed, at step 2402 it is checked whether the registration data in the facsimile 120 is to be changed.

The changed contents and changed user are identified from the change notification, and if there is no problem even if the registration contents of the facsimile 120 are changed, then the change process is conducted.

If a change in the registration contents is not proper such as if the changed user is a person not permitted to access the facsimile 120, the registration contents are not changed and the change process terminates.

If the registration contents are changed, at step 2403 it is checked whether the facsimile 120 has a registration list containing the data corresponding to the change contents.

Specifically, if the registration change contents are a dial number "345-6789" registered in the name of TANAKA, it is checked whether this dial number is present.

If there is no list containing the corresponding data, the registration change is terminated.

If the list containing the corresponding data is detected, at step 2404 it is checked whether the list contains the dial number registered in the name of TANAKA.

If there is the dial number, at step 2405 it is checked whether the dial number can be changed. If possible, at step 2406 the dial number corresponding to the name of TANAKA is changed to "345-6789", and the next registration contents are referred to at step 2404 to continue the registration change.

If the registration change is not possible, the next registration name is referred to continue the registration change.

If all the registration names in the list are checked, the next registration list is checked at step 2403.

If all the corresponding lists are checked, the registration content change is terminated.

If the list is searched by a name, a plurality of candidates whose registration contents are changed may appear. A plurality of search items may therefore be used if necessary.

Also if necessary, a plurality of dial numbers having the same name may be changed.

FIG. 25 is a flow chart illustrating a process to be executed by the facsimile server 118 wherein a priority order of the facsimiles 120, 121, and 122 connected to the facsimile server 118 is changed and registered, the priority order data being specific to the facsimile server 118.

The priority order is set by a user in accordance with, for example, the communication ability of each facsimile.

Specifically, the facsimile having a fast communication speed is preferentially used during broadcast.

At step 2501, the priority order data (1:120, 2:121, 3:122) is read from the storage area of the facsimile server 118.

At step 2502, the priority data is changed from (1:120, 2:121, 3:122) to (1:121, 2:122, 3:120).

At step 2503, the changed priority order data (1:121, 2:122, 3:120) is registered in the storage area of the facsimile server 118.

At step 2504, it is checked whether the changed priority data is not necessary to be transferred to other terminals, and thereafter, the registration change process is terminated.

In the registration change process described above, the dial number registered in the name of a user is changed. The notification contents and means may be different from the above, such as a name change and a registration number change, so long as the destination side can correctly know the change contents and change the registration contents in accordance with the change notification.

As described so far, in the communication system having facsimiles with a registration data change function and a computer, registration change data is transferred from a facsimile to the computer to update the registration data in the computer. In this manner, the operation of registration data change can be made easily.

In a communication system with a plurality of facsimiles and a computer, registration change data is transferred from one facsimile to the computer which updates the registration data therein, and the registration change data is transferred to other facsimiles. In this manner, the operation of registration data change for a plurality of facsimiles can be made easily.

The data shared in common among a plurality of facsimiles can be changed for all necessary facsimiles by changing the common data in one facsimile or in the computer. Therefore, data integrity can be improved.

Registration data in a facsimile can be changed in the manner similar to registration data change of a conventional facsimile operating singularly.

Registration data in a computer can be updated by not only the computer or terminals on the network but also by a facsimile or an external terminal via the facsimile. Therefore, the number of terminals controllable by one terminal can be increased.

The computer and facsimiles share common data. Therefore, even if the computer or facsimile server shuts down, each facsimile can change registration data and store message data through communications with another facsimile, and after the system resumes its operation, the registration change data and message data can be transferred to the system.

The system can be made easier to use by determining whether registration change data is transferred to another terminal, in accordance with the type of data.

The processes of the embodiments are executed by CPU 101 of the facsimile in accordance with programs stored in ROM 102, and by a CPU (not shown) of the facsimile server in accordance with programs installed in a memory (not shown) of the facsimile server.

The present invention may be applied to a system constituted by a plurality of apparatuses (e.g., a host computer, interface units, a reader, a printer, and the like) or to a system constituted by a single apparatus (e.g., a copier or a facsimile).

The scope of the invention also includes a system or apparatus whose computer (CPU or MPU) runs to operate various devices connected thereto in accordance with software program codes supplied to the system or apparatus so as to realize the functions of the above embodiments.

In this case, the software program codes themselves realize the embodiment functions. Therefore, the program code themselves and means for supplying such program codes to a computer, e.g., a storage medium storing such program codes, constitute the present invention.

The operation of this invention can be easily realized by other systems and apparatuses capable of using the data stored in such a storage medium by making the medium detachable.

The storage medium storing such program codes may be a floppy disk, a hard disk, an optical disk, an optomagnetic disk, a CD-ROM, a magnetic tape, a non-volatile memory card, and a ROM.

Obviously, such program codes are other types of embodiments of this invention, not only for the case wherein the embodiment functions are realized by executing the program codes supplied to the computer but also for the case wherein the embodiment functions are realized by the program codes used with an OS (operating system) on which the computer runs or with other various types of application software.

Furthermore, the scope of the invention also includes obviously the case wherein in accordance with the program codes stored in a memory of a function expansion board or unit connected to the computer supplied with the program codes, a CPU or the like of the function board or unit executes part or the whole of the actual tasks for realizing the embodiment functions.

The invention has been described in connection with the above preferred embodiments. The invention is not limited only to the above embodiments, but various modification are possible without departing from the scope of the appended claims.

What is claimed is:

1. A data processing method in a data processing system having at least two apparatuses comprising the steps of:
   periodically monitoring whether a first setting information relating to an operation of the one apparatus and set in the one apparatus is changed using a server;
   storing the change to said first setting information in a memory of said server;
   transmitting the changes to said first setting information from said server memory to another apparatus; and
   changing a second setting information set in said another apparatus in response to the first setting information being changed.

2. A data processing method according to claim 1, further comprising a step of determining whether the changed first setting information relates to a setting information in said another apparatus and changing the second setting information according to the determination result.

3. A data processing apparatus comprising:
   a connector which connects the apparatus to another apparatus;
   a memory which stores a setting information relating to an operation of said data processing apparatus;
   a detector in a server which periodically detects a change of the setting information stored in said memory; and
   a transmitter in said server which transmits the changed setting information from said server memory to the other apparatus connected via said connector in accordance with the detection by said detector.

4. A data processing apparatus according to claim 3, wherein said connector connects said data processing apparatus to a LAN (Local Area Network) that is connectable to a plurality of apparatuses.

5. A data processing apparatus according to claim 3, wherein the other apparatus to which said transmitter transmits the changed setting information stored in said memory holds information relating to the setting information.

6. A data processing apparatus according to claim 3, further comprising
   determination means for determining whether the changed setting information is to be transmitted by said transmitter, wherein said transmitter transmits the changed setting information when said determination means determines that the changed setting information is to be transmitted.

7. A data processing apparatus according to claim 3, wherein the other apparatus connected via said connector is a facsimile apparatus.

8. A data processing apparatus according to claim 7, wherein the transmitter further transmits data for controlling an operation of the facsimile apparatus.

9. A data processing method for a data processing apparatus comprising the steps of:
   setting a setting information relating to an operation of said data processing apparatus;
   periodically detecting a change of the setting information set in said setting step using a server;
   storing a change to said setting information set in a memory of said server; and
   transmitting the changed setting information from said server to another apparatus connected to said data processing apparatus in accordance with the detection in said detecting step.

10. A computer readable program, stored in a storage medium, for controlling a data processing apparatus, said program comprising the steps of:
   setting a setting information relating to an operation of said data processing apparatus;
   periodically detecting a change of the setting information set in said setting step using a server;
   storing a change to said setting information set in a memory of said server; and
   transmitting the changed setting information from said server to another apparatus connected to said data processing apparatus in accordance with the detection in said detecting step.

11. A data processing method in a data processing system having at least two apparatuses with registration data comprising the steps of:

periodically monitoring at least one remote apparatus of the at least two apparatuses to determine whether a registration data in the at least one remote apparatus is changed using a server;

storing a change to said registration data in a memory of said server; and transmitting the changed registration data the at least one remote apparatus from said server to at least one local apparatus and changing automatically registration data in the at least one local apparatus in response to the change being monitored.

12. A data processing method according to claim 11, further comprising a step of:

determining whether the changed registration data relates to a registration data in the at least one local apparatus and changing the registration data in the at least one local apparatus according to the determination result.

13. A data processing apparatus comprising:

a connector which connects the apparatus to at least one remote apparatus;

a memory which stores a registration data relating to an operation of said data processing apparatus;

a detector in a server which periodically detects a change of a registration data stored in a memory of the at least one remote apparatus; and a receiver in said server which receives the changed registration data from the at least one remote apparatus connected via said connector in accordance with the detection by said detector for transmitting to another data processing apparatus.

14. A data processing apparatus according to claim 13, wherein said connector connects said data processing apparatus to a LAN (Local Area Network) that is connectable to a plurality of remote apparatuses.

15. A data processing apparatus according to claim 13, wherein the apparatus which receives the changed registration data into said memory holds information relating to a registration data in said at least one remote apparatus.

16. A data processing apparatus according to claim 13, further comprising determination means for determining whether the changed registration data is to be received by said receiver, wherein said receiver receives the changed registration data when said determination means determines the changed registration data is to be received.

17. A data processing apparatus according to claim 13, wherein the at least one remote apparatus connected via said connector is a facsimile apparatus.

18. A data processing apparatus according to claim 17, wherein the receiver further receives data for controlling an operation of the facsimile apparatus.

19. A data processing method for a data processing apparatus comprising the steps of:

periodically detecting a change of a registration data in a memory of at least one remote apparatus using a server;

storing the change of registration data in a memory of said server;

transmitting the change of registration data from said server to at least one local apparatus connected to said at least one remote apparatus; and receiving the changed registration data in at least one local apparatus connected to said at least one remote apparatus in accordance with the detection in said detecting step and changing automatically registration data in the at least one local apparatus.

20. A computer readable program, stored in a storage medium, for controlling a data processing apparatus, said program comprising the steps of:

periodically detecting a change of a registration data in a memory of at least one remote apparatus wherein the program is implemented in a server;

storing the change of registration data in a memory of said server;

transmitting the change of registration data from said server to at least one local apparatus connected to said at least one remote apparatus; and receiving the changed registration data in at least one local apparatus connected to said at least one remote apparatus in accordance with the detection in said detecting step and changing automatically registration data in the at least one local apparatus.

* * * * *